(12) United States Patent
Jang et al.

(10) Patent No.: US 9,129,241 B2
(45) Date of Patent: Sep. 8, 2015

(54) COMPONENT FOR A NETWORK SYSTEM

(75) Inventors: Yongwoon Jang, Changwon-si (KR);
Yanghwan Kim, Changwon-si (KR);
Junho Ahn, Changwon-si (KR);
Jeongwon Lee, Changwon-si (KR);
Koonseok Lee, Changwon-si (KR);
Hoonbong Lee, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 290 days.

(21) Appl. No.: 13/810,525

(22) PCT Filed: Jul. 15, 2011

(86) PCT No.: PCT/KR2011/005234
§ 371 (c)(1),
(2), (4) Date: Mar. 29, 2013

(87) PCT Pub. No.: WO2012/008799
PCT Pub. Date: Jan. 19, 2012

(65) Prior Publication Data
US 2013/0181649 A1    Jul. 18, 2013

(30) Foreign Application Priority Data

Jul. 16, 2010 (KR) ................. 10-2010-0069193
Aug. 23, 2010 (KR) ................. 10-2010-0081170
Nov. 26, 2010 (WO) ................. PCT/IB2010/003388

(51) Int. Cl.
*H02P 1/00* (2006.01)
*H04L 12/16* (2006.01)
(Continued)

(52) U.S. Cl.
CPC ........ *G06Q 10/0631* (2013.01); *A47L 15/0047* (2013.01); *A47L 15/0063* (2013.01);
(Continued)

(58) Field of Classification Search
CPC ........ G06Q 50/06; H02J 3/14; Y02B 70/3225
USPC .......... 318/445, 446, 430, 432, 434; 700/291, 700/295, 22; 8/137; 340/870.11
See application file for complete search history.

(56) References Cited

U.S. PATENT DOCUMENTS

| | | | | |
|---|---|---|---|---|
| 6,061,668 | A | * | 5/2000 | Sharrow ................. 705/400 |
| 6,732,019 | B2 | * | 5/2004 | Spool et al. ............ 700/291 |

(Continued)

FOREIGN PATENT DOCUMENTS

| EP | 2 491 681 A1 | 8/2012 |
|---|---|---|
| EP | 2 582 094 A1 | 4/2013 |

(Continued)

OTHER PUBLICATIONS

International Search Report issued in PCT Application No. PCT/IB2010/003388 dated Jul. 1, 2011.

(Continued)

*Primary Examiner* — Paul Ip
(74) *Attorney, Agent, or Firm* — Ked & Associates, LLP

(57) ABSTRACT

Provided is a component for a network system, which includes a communication device for receiving at least energy information, a component driver part driven by supplied energy, and a control part that recognizes high price-related information or low price-related information, based on the energy information received by the communication device and that controls the component driver part. A method of controlling the component driver part when the high price-related information is recognized is different from a method of controlling the component driver part when the low price-related information is recognized.

10 Claims, 20 Drawing Sheets

(51) Int. Cl.
*G06Q 10/06* (2012.01)
*A47L 15/00* (2006.01)
*D06F 33/02* (2006.01)
*H02J 3/32* (2006.01)
*H02P 29/00* (2006.01)
*H04L 12/28* (2006.01)
*H02J 3/38* (2006.01)

(52) U.S. Cl.
CPC . *D06F33/02* (2013.01); *H02J 3/32* (2013.01); *H02J 3/383* (2013.01); *H02J 3/386* (2013.01); *H02P 29/00* (2013.01); *H04L 12/2827* (2013.01); *A47L 2401/34* (2013.01); *H02J 3/382* (2013.01); *Y02B 70/325* (2013.01); *Y02E 10/563* (2013.01); *Y02E 10/763* (2013.01); *Y02E 70/30* (2013.01); *Y04S 20/228* (2013.01)

(56) References Cited

U.S. PATENT DOCUMENTS

| | | | |
|---|---|---|---|
| 6,853,291 B1* | 2/2005 | Aisa | 340/3.3 |
| 7,062,361 B1 | 6/2006 | Lane | |
| 7,127,330 B2* | 10/2006 | Spool et al. | 700/291 |
| 7,715,951 B2* | 5/2010 | Forbes et al. | 700/291 |
| 8,010,812 B2* | 8/2011 | Forbes et al. | 713/300 |
| 8,032,233 B2* | 10/2011 | Forbes et al. | 700/22 |
| 8,183,995 B2* | 5/2012 | Wang et al. | 340/539.1 |
| 8,560,133 B2* | 10/2013 | Venkatakrishnan et al. | 700/291 |
| 8,818,535 B2* | 8/2014 | Drake et al. | 700/86 |
| 8,903,560 B2* | 12/2014 | Miller | 700/291 |
| 2002/0030478 A1* | 3/2002 | Nagamitsu et al. | 324/110 |
| 2003/0040844 A1* | 2/2003 | Spool et al. | 700/286 |
| 2003/0139939 A1* | 7/2003 | Spool et al. | 705/1 |
| 2003/0178894 A1 | 9/2003 | Ghent | 307/140 |
| 2005/0138929 A1 | 6/2005 | Enis et al. | |
| 2006/0276938 A1* | 12/2006 | Miller | 700/295 |
| 2007/0239317 A1 | 10/2007 | Bogolea et al. | |
| 2007/0276547 A1* | 11/2007 | Miller | 700/295 |
| 2008/0106146 A1 | 5/2008 | Baek et al. | 307/35 |
| 2008/0272934 A1* | 11/2008 | Wang et al. | 340/870.11 |
| 2009/0094173 A1* | 4/2009 | Smith et al. | 705/412 |
| 2010/0070091 A1* | 3/2010 | Watson et al. | 700/278 |
| 2010/0089909 A1* | 4/2010 | Besore et al. | 219/720 |
| 2010/0092625 A1* | 4/2010 | Finch et al. | 426/231 |
| 2010/0094470 A1* | 4/2010 | Besore et al. | 700/282 |
| 2010/0101254 A1* | 4/2010 | Besore et al. | 62/264 |
| 2010/0121499 A1* | 5/2010 | Besore et al. | 700/295 |
| 2010/0138363 A1* | 6/2010 | Batterberry et al. | 705/412 |
| 2010/0146712 A1* | 6/2010 | Finch et al. | 8/137 |
| 2010/0161148 A1* | 6/2010 | Forbes et al. | 700/295 |
| 2010/0174419 A1* | 7/2010 | Brumfield et al. | 700/295 |
| 2010/0174558 A1* | 7/2010 | Smith et al. | 705/3 |
| 2010/0174668 A1* | 7/2010 | Finch et al. | 705/412 |
| 2010/0175719 A1* | 7/2010 | Finch et al. | 134/18 |
| 2010/0179670 A1* | 7/2010 | Forbes et al. | 700/22 |
| 2010/0179672 A1* | 7/2010 | Beckmann et al. | 700/94 |
| 2010/0191862 A1* | 7/2010 | Forbes et al. | 709/240 |
| 2010/0207728 A1* | 8/2010 | Roscoe et al. | 340/10.1 |
| 2010/0217452 A1* | 8/2010 | McCord et al. | 700/295 |
| 2010/0332373 A1* | 12/2010 | Crabtree et al. | 705/37 |

FOREIGN PATENT DOCUMENTS

| | | |
|---|---|---|
| KR | 10-2002-0047627 | 6/2002 |
| KR | 10-2003-0021569 | 3/2003 |
| KR | 10-2007-0098172 | 10/2007 |
| KR | 10-2009-0026029 | 3/2009 |
| KR | 10-2009-0046543 | 5/2009 |
| WO | WO 2011/048181 A1 | 4/2011 |

OTHER PUBLICATIONS

International Search Report issued in PCT Application No. PCT/KR2011/005234 dated Apr. 4, 2012.
European Search Report dated Nov. 26, 2013 issued in Application No. 11 80 7084.

* cited by examiner (a)

(b)

(c)

(d)

(e)

(f)

(g)

(a)

(b)

(c)

(d)

(a)

(b)

(c)

(d)

(e)

(f)

COMPONENT FOR A NETWORK SYSTEM

CROSS-REFERENCE TO RELATED PATENT APPLICATIONS

This application is a U.S. National Stage Application under 35 U.S.C. §371 of PCT Application No. PCT/KR2011/005234, filed Jan. 15, 2011, which claims priority to Korean Patent Application No. 10-2010-0069193 filed on Jul. 16, 2010, Korean Application No. 10-2010-0081170 filed on Aug. 23, 2010, and PCT Application No. PCT/IB2010/003388 filed on Nov. 26, 2010, whose entire disclosures are hereby incorporated by reference.

BACKGROUND

The present disclosure relates to a component for a network system.

A provider has simply provided energy sources such as electricity, water and gas while a consumer has simply used the supplied energy sources. This makes difficult to realize efficient management in terms of the generation, distribution and use of energy. Therefore, a network system for effectively managing energy is in need.

SUMMARY

Embodiments provide a component for a network system, which can effectively manage an energy source.

In one embodiment, a component for a network system includes: a communication device for receiving at least energy information; a component driver part driven by supplied energy; and a control part that recognizes high price-related information or low price-related information, based on the energy information received by the communication device and that controls the component driver part, wherein a method of controlling the component driver part when the high price-related information is recognized is different from a method of controlling the component driver part when the low price-related information is recognized.

According to embodiments, an energy source can be efficiently produced, used, distributed, and stored, thus enabling the effective management of the energy source.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

Figure 1:
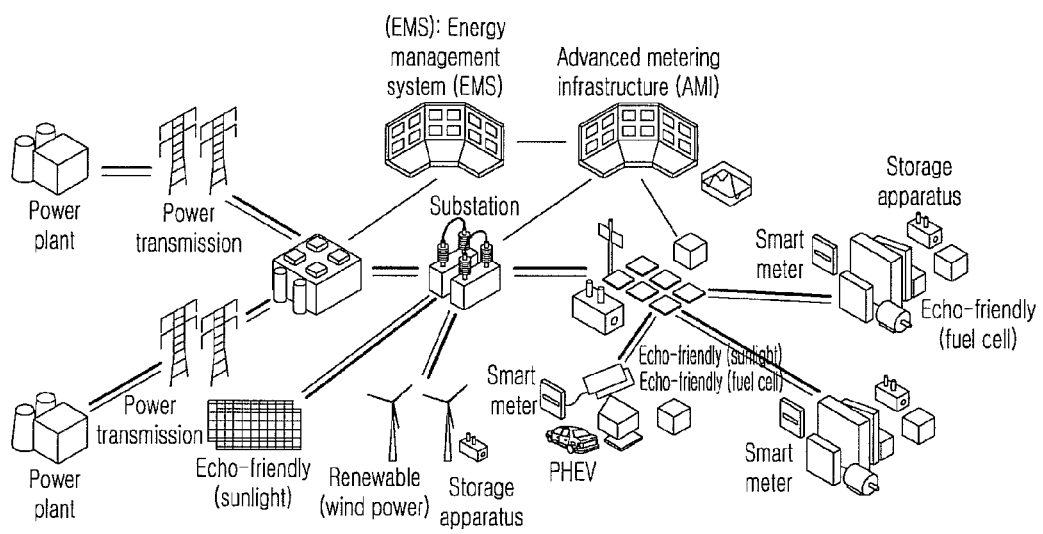
FIG. 1 is a view schematically showing an example of a network system according to the present disclosure.

FIG. 1 is a view schematically showing an example of a network system according to the present disclosure.

The network system is a system for managing an energy source such as electricity, water or gas. The energy source means one of which amount generated or used can be metered. Therefore, even a source not mentioned above may be used as the energy source. Hereinafter, electricity will be described as an example of the energy source, and details of this specification may be identically applied to other energy sources.

Referring to FIG. 1, a network system according to an embodiment includes a power plant for producing electricity. The power plant may include a power plant for producing electricity through a thermal power generation or nuclear power generation and a power plant using water power, sunlight power, wind power or the like which is eco-friendly energy.

The electricity produced in the power plant is transmitted to a sub-control center through a power transmission line, and the sub-control center transmits the electricity to a substation so that the electricity is distributed to customers such as houses or offices.

Electricity produced by the eco-friendly energy is also transmitted to the substation so as to be distributed to each of the customers. The electricity transmitted from the substation is distributed to each of the offices or houses through electricity power storage, or is directly distributed to each of the offices or houses.

In a house using a home area network (HAN), electricity may be produced by itself through sunlight, fuel cells built in a plug-in hybrid electric vehicle (PHEV), or the like. Also, the produced electricity may be stored or distributed, or surplus electricity may be resold to the outside world.

The network system may include a smart meter for detecting the amount of electricity used in each customer (house, office or the like) in real time, and an advanced metering infrastructure (AMI) for metering the amount of electricity used in a plurality of customers.

The network system may further include an energy management system (EMS) for managing energy. The EMS may generate information on operations of one or more components with respect to energy (production of energy, distribution of energy, usage of energy, storage of energy, and the like). The EMS may generate at least a command for the operations of the components.

In this specification, a function or solution performed by the EMS may be referred to as an energy management function or energy management solution.

In the network system, one or more EMSs may be provided as a separate configuration, or the EMS may be included as an energy management function or energy management solution in one or more components.

Figure 2:
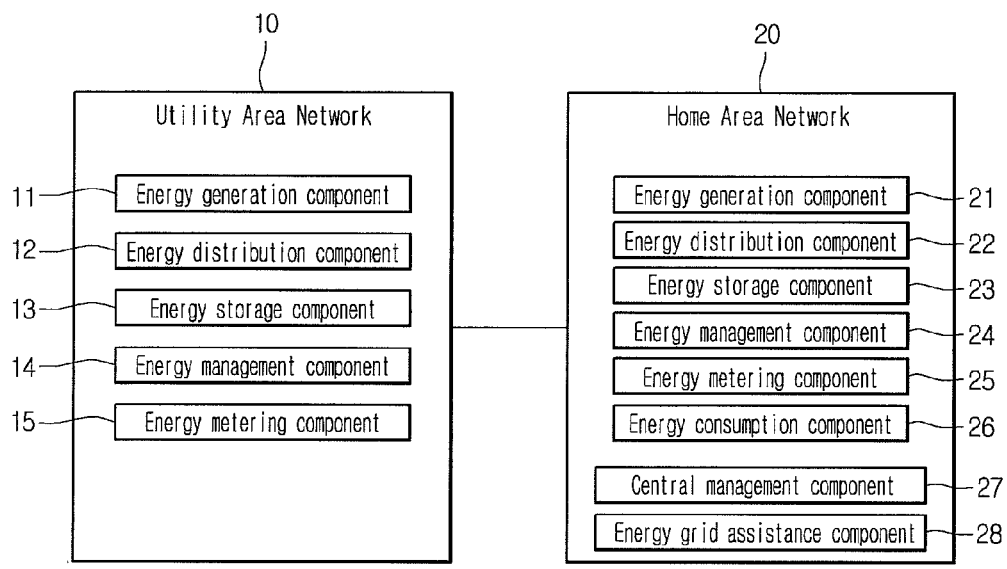
FIG. 2 is a block diagram schematically showing an example of the network system according to the present disclosure.

FIG. 2 is a block diagram schematically showing an example of the network system according to the present disclosure.

Referring to FIGS. 1 and 2, the network system according to the present disclosure is configured by a plurality of components. For example, the components of the network system are a power plant, a substation, a sub-control center, an EMS, electric home appliances, a smart meter, a storage battery, a web server, an AMI, a home server, and the like.

In the present disclosure, each of the components may be configured by a plurality of sub-components. As an example, in a case of one component is an electric home appliance, sub-components may be a microcomputer (MICOM), a heater, a display and the like. That is, all that perform a specific function may be components in the present disclosure, and such components constitute the network system of the present disclosure. Two components may communicate with each other by means of a communication unit. One network may be one component or may be configured by a plurality of components.

In this specification, the network system in which communication information is related to an energy source may be referred to as an energy grid.

A network system according to an embodiment may include a utility area network (UAN) 10 and a home area network (HAN) 20. The UAN 10 and the HAN 20 may perform wired or wireless communication by means of a communication unit, and may perform two-way communication.

In this specification, the term "home" means not only a household as a lexical meaning but also a group in which specific components such as buildings or companies gather. Also, the term "utility" means a group in which specific components outside the home gather.

The UAN 10 includes an energy generation component 11 for generating energy, an energy distribution component 12 for distributing or transmitting energy, an energy storage component for storing energy, an energy management component 14 for managing energy, and an energy metering component 15 for metering information related to energy.

In a case where one or more components that constitute the UAN 10 consume energy, the components that consume the energy may be energy consumption components.

The energy consumption component is a component corresponding to the energy consumption component 26 that constitutes the HAN 20. The energy consumption component may be the same component as the energy consumption component 26 or may be another component distinguished from the energy consumption component 26.

The energy generation component 11 may be a power plant as an example. The energy distribution component 12 distributes or transmits energy generated in the energy generation component 11 and/or energy stored in the energy storage component 13 to the energy consumption component 26 that consumes the energy. The energy distribution component 12 may be a power transmitter, substation, sub-control center, or the like.

The energy storage component 13 may be a storage battery, and the energy management component 14 generates information for driving one or more of the energy generation component 11, the energy distribution component 12, the energy storage component 13 and the energy consumption component 26, related to energy. The energy management component 14 may generate at least a command for the operation of a specific component.

The energy management component 14 may be an EMS. The energy metering component 15 may meter information related to the generation of energy, the distribution of energy, the usage of energy, the storage of energy, and the like. The energy metering component 15 may be an AMI as an example. The energy management component 14 may be a separate configuration, or may be included in another component as an energy management function.

The UAN 10 may communicate with the HAN 20 by a terminal component (not shown). That is, information generated or transferred in a specific component that constitutes the UAN may be transmitted to the HAN 20 through the terminal component, or information generated or transferred in another component that constitutes the HAN 20 may be received to the UAN 10 through the terminal component. The terminal component may be a gate way as an example. The terminal component may be provided to one or more of the UAN 10 and the HAN 20.

The terminal component may be a component necessary for transmitting/receiving information between the UAN and the HAN.

Two components that constitute the UAN 10 may communicate with each other by means of a communication unit.

The HAN 20 includes an energy generation component 21 for generating energy, an energy distribution component 22 for distributing energy, an energy storage component 23 for storing energy, an energy management component 24 for managing energy, an energy metering component 25 for metering information related to energy, an energy consumption component 26 for consuming energy, a central management component 27 for controlling a plurality of components, and an energy grid assistance component 28.

The energy generation component 21 may be a home power generator, and the energy storage component 23 may be a storage battery. The energy management component 24 may be an EMS. As an example, the energy generation component 21 may be a solar cell, a fuel cell, a wind power generator, a power generator using subterranean heat, a power generator using seawater, or the like.

The energy storage component 23 may perform storage using energy generated from the energy generation component 21. Therefore, in view of the use of energy, the energy storage component 23 and the energy generation component 11 may be an energy using component that uses energy together with the energy consumption component 26. That is, the energy using component may include at least an energy consumption component, an energy generation component and an energy storage component. In a case where the energy management component uses energy, it may be included in the energy using component.

In view of the supplied energy, the energy storage component 23, the energy consumption component and the energy generation component 11 may be an energy supplied component to which energy is supplied.

The energy metering component 25 may meter information related to the generation of energy, the distribution of energy, the usage of energy, the storage of energy, and the like. The energy metering component 25 may be a smart meter as an example. The energy consumption component 26 may be, as an example, an electric home appliance or a heater, motor, display or the like, which constitutes the electric home appliance. In this embodiment, there is no limitation in the kind of the energy consumption component 26.

Specifically, the energy generation component 21 may be another component of the UAN 10, which generates energy to be supplied to the HAN 20.

The energy management component 24 may be provided as a separate configuration or may be included in another component as an energy management function. As an example, the energy management function may be performed by a control component that controls the energy consumption component. In a case where the control component performs the energy management function, it may be an energy management component.

Specifically, the energy management component 14 that constitutes the UAN 10 or the energy management component 24 that constitutes the HAN 20 may be built in one or more of the plurality of components that constitute the networks 10 and 20, or may exist as a separate device. The energy management component 24 may recognize the information related to energy (energy information) and the state information of a component controlled by the energy management component 24.

The energy generation component 21, the energy distribution component 22 and the energy storage component 23 may be individual components, or may constitute a single component.

The central management component 27 may be, as an example, a home server for controlling a plurality of electric home appliances.

The energy grid assistance component 28 is a component having a primary function while performing an additional function for the energy grid. For example, the energy grid assistance component 28 may be a web service providing component (e.g., a computer or the like), mobile device, television, or the like.

The mobile device may receive energy information or additional information (described later), and control the operation of at least the energy consumption component 26 using the received information.

Two components that constitute the HAN 20 may communicate with each other by means of a communication unit.

The energy generation components 11 and 21, the energy distribution components 12 and 22, the energy storage components 13 and 23, the energy management components 14 and 24, the energy metering components 15 and 25, the energy consumption component and the central management component 27 may independently exist, or two or more of them may constitute a single component.

For example, the energy management component 14 or 24, the energy metering component 15 or 25 and the central management component 27 may exist as single components so as to be configured as a smart meter, an EMS and a home server, which perform their functions, respectively. Alternatively, the energy management component 14 or 24, the energy metering component 15 or 25 and the central management component 27 may constitute a single system.

When a function is performed, it may be sequentially performed in a plurality of components and/or communication units. For example, an energy management function may be sequentially performed in the energy management component, the energy metering component and the energy consumption component.

In the network system, a plurality of UANs 10 may communicate with a single HAN 20, and a single UAN 10 may communicate with a plurality of HANs 20.

The component with a specific function, which constitutes the UAN and the HAN, may be configured as a plurality of components. For example, the energy generation component, the energy consumption component or the like may be configured as a plurality of components.

In this specification, each of the components that constitute the UAN and HAN may having a function performing component that performs its own function, or each of the components itself may be a function performing component.

As an example, in a case where the energy consumption component is an electric product, the electric product has a function performing component such as a heater, compressor, motor or display. As another example, in a case where the energy consumption component is a heater, compressor, motor, display or the like, the energy consumption component itself is a function performing component.

Figure 3:
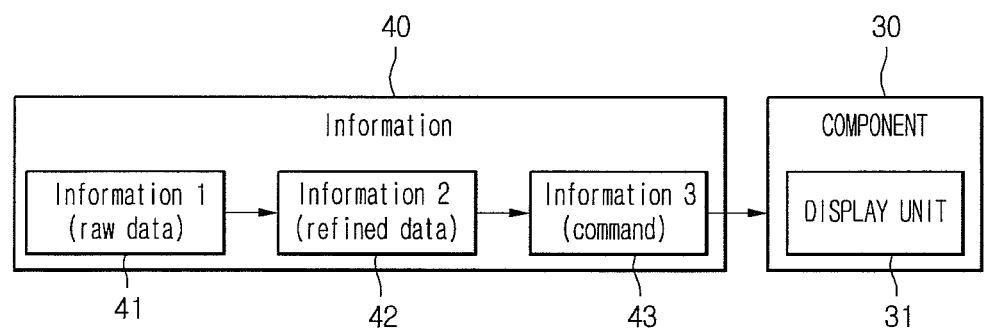
FIG. 3 is a block diagram showing an information transmission process on the network system according to the present disclosure.

FIG. 3 is a block diagram showing an information transmission process on the network system according to the present disclosure.

Referring to FIG. 3, in the network system according to the present disclosure, a specific component 30 may receive information related to energy (hereinafter, referred to as energy information 40) by means of a communication unit. The specific component 30 may further receive additional information (environment information, time information and the like) by means of the communication unit. In this instance, the information may be received from another component. That is, at least energy information is contained in the received information.

The specific component 30 may be a component that constitutes the UAN 10 or a component that constitutes the HAN 20.

As described above, the energy information 40 may be one of information related to electricity, water, gas and the like. Hereinafter, information related to electricity will be described as an example of the energy information, but information related to other energy sources may be identically applied.

For example, the kind of information related to the electricity may include time-based pricing, curtailment, grid emergency, grid reliability, energy increment, operation priority, and the like.

The information may be divided into scheduled information previously produced based on previous information, and real-time information changed in real time. The scheduled information and the real-time information may be divided by whether or not predict information after the current time (in the future).

The energy information 40 may be transmitted/received as a true or false signal such as a Boolean signal on the network system, or may be transmitted/received as a real price. Alternatively, the energy information 40 may be transmitted/received by being divided into a plurality of levels.

The energy information 40 may be divided into time of use (TOU) information, critical peak pattern (CPP) information or real time pattern (RTP) information according to the change in the pattern of data with respect to time.

According to the TOU information, a data is changed step by step depending on time. According to the CPP information, a data is changed step by step or in real time depending on time, and emphasis is displayed at a specific point of time. According to RTP information, a data is changed in real time depending on time.

In a case where the energy information is time-based pricing information as an example, the time-based pricing information is changed. The time-based pricing information may be transmitted/received as a true or false signal such as a Boolean signal on the network system, or may be transmitted/received as a real price. Alternatively, the time-based pricing information may be transmitted/received by being divided into a plurality of levels.

In a case where the specific component 30 receives a true or false signal such as a Boolean signal, one signal may be recognized as an on-peak signal, and the other signal may be recognized as an off-peak signal.

Alternatively, the specific component 30 may recognize information on at least one drive, which contains the time-based information, and may recognize an on-peak or off-peak signal by comparing the value of the recognized information with the value of reference information.

For example, in a case where the specific component 30 recognizes information divided into levels or real pricing information, it recognizes an on-peak or off-peak signals by comparing the value of the recognized information with the value of reference information.

In this case, the value of the information on drive may be at least one of time-based pricing, electric energy, the variation of time-based pricing, the variation of electric energy, the average of time-based pricing and the average of electric energy. The value of reference information may be at least one of an average, the average between maximum and minimum values of power information during a predetermined period of time and the reference variation of power information during the predetermined period of time (e.g., the slope of consumed electric energy per unit time).

The value of reference information may be determined in real time or may be previously determined. The value of reference information may be determined on the UAN or may be determined on the HAN (a customer's direct input or an input from the energy management component, the central management component or the like).

In a case where the specific component 30 (e.g., the energy consumption component) recognizes an on-peak signal (e.g., at a point of time of recognition), an output may be determined as zero (stop or maintenance of a stop state) or may be decreased. If necessary, the output may be restored or increased. The driving scheme of the specific component may be previously determined before the specific component is operated, or may be changed when the specific component recognizes an on-peak signal posterior to the start of operation.

Alternatively, in a case where the specific component recognizes an on-peak signal (e.g., at a point of time of recognition), the output is maintained under an operable condition. In this case, the operable condition means that the value of the information on drive is less than a predetermined reference. The value of the information on drive may be time-based pricing, consumed electric energy, operation time, or the like. The predetermined reference may be a relative or absolute value.

The predetermined reference may be determined in real time or may be previously determined. The predetermined reference may be determined on the UAN or may be determined on the HAN (a customer's direct input or an input from the energy management component, the central management component or the like).

Alternatively, in a case where the specific component 30 recognizes high-cost information, the output of the specific component may be maintained or increased when the difference between a state information value and a reference value is within a predetermined range. For example, in a case where a compressor of a refrigerator is not operated in a low-cost section, the temperature of a cool chamber or freezing chamber is increased. Therefore, the compressor is necessarily turned on when the temperature of the cool chamber or freezing chamber approaches a reference temperature. In a case where a high-cost section comes after the compressor is turned on, the compressor maintains a current output when the difference between the temperature of the cool chamber or freezing chamber and the reference temperature is within a predetermined range. In a case where a user selects a button for cancelling power saving in the state that the specific component 30 recognizes the high-cost information, the output of the specific component may be maintained.

Alternatively, in a case where the specific component recognizes an on-peak signal (e.g., at a point of time of recognition), the output may be increased. However, although the output is increased at the point of time when the specific component recognizes the on-peak signal, the total output amount of the specific component during the entire drive period may be decreased or maintained as compared with that when the specific component is operated at a normal output level. Alternatively, although the output is increased at the point of time when the specific component recognizes the on-peak signal, the total consumed power or total time-based pricing of the specific component during the entire operation period may be decreased as compared that when the specific component is operated at a normal output level.

In a case where the specific component 30 recognizes an off-peak signal (e.g., at a point of time of recognition), the output may be increased. For example, in a case where the operation reservation of the specific component is set up, the drive of the specific component may be started before the setup time, or a component having a large output among a plurality of components may be first driven. In a case where the specific component is a refrigerator, supercooling may be performed by increasing an output as compared with the existing output (change in the state of cool air that is a medium for performing the function of the refrigerator). In a case where the specific component is a washing machine or washer, hot water may be stored by driving a heater earlier than the time when the heater is to be operated (storage of hot water that is an additional medium for performing the function of the washing machine or washer). Alternatively, in a case where the specific component is a refrigerator, cool air may be stored in a separate supercooling chamber by increasing an output as compared with the existing output. Alternatively, in a case where the specific component recognizes an off-peak signal (e.g., at a point of time of recognition), electricity may be stored.

The curtailment information is information related to a mode in which the specific component is stopped or a small amount of time-based pricing is taken. As an example, the curtailment information may be transmitted/received as a true or false signal such as a Boolean signal on the network system.

If the specific component 30 recognizes curtailment information, the output may be determined as zero (stop or maintenance of a stop state) or may be decreased as described above.

The grid emergency information is information related to a power failure or the like. As an example, the grid emergency information may be transmitted/received as a true or false signal such as a Boolean signal on the network system. The information related to a power failure or the like has a relation with the reliability of a component using energy.

In a case where the specific component 30 recognizes grid emergency information, it may be immediately shut down.

The grid reliability information is information related to the supply amount of electricity supplied or information related to the quality of electricity. The grid reliability information may be transmitted/received as a true or false signal such as a Boolean signal on the network system, or may be determined by a component (e.g., an electric home appliance) through the frequency of AC power supplied to the component.

That is, if a frequency lower than the frequency of AC power supplied to the component is sensed, it may be determined that the amount of electricity supplied is small (information on the deficiency of the amount of electricity supplied). If a frequency higher than the frequency of AC power supplied to the component is sensed, it may be determined that the amount of electricity supplied is large (information on the excess of the amount of electricity supplied).

In a case where the specific component recognizes shortage of the amount of electricity or poor quality of electricity in the grid reliability information, an output may be determined as zero (stop or maintenance of a stop state) or may be decreased. If necessary, the output may be restored or increased.

On the other hand, in a case where the specific component recognizes the information on the excess of the amount of electricity supplied, the output may be increased, or the operation may be converted from an off-state to an on-state.

The energy increment information is information related to a state that surplus electricity is generated because the amount of electricity used by a component is less than that of power generation. As an example, the energy increment information may be transmitted/received as a true or false signal such as a Boolean signal on the network system.

In a case where the specific component 30 recognizes energy increment information, the output may be increased. For example, in a case where the operation reservation of the specific component is set up, the drive of the specific component may be started before the setup time, or a component having a large output among a plurality of components may be first driven. In a case where the specific component is a refrigerator, supercooling may be performed by increasing an output as compared with the existing output. In a case where the specific component is a washing machine or a washer, hot water may be stored by driving a heater earlier than the time when the heater is to be operated. Alternatively, in a case where the specific component recognizes an off-peak signal (e.g., at a point of time of recognition), electricity may be stored.

Meanwhile, in a case where the specific component 30 is the energy storage component 13 or 23, the energy storage component 13 or 23 may store electricity by receiving the electricity supplied from the UAN, for example, when electricity storage cost is smaller than a predetermined value.

However, in a case where the energy storage component 23 is connected to the energy generation component 21 that constitutes the HAN, it may continuously store energy generated by the energy generation component 21 until the electricity storage is completed. That is, the energy generated while the energy generation component 21 generates energy may be stored in the energy storage component 23.

The presence of completion of the electricity storage is determined while the energy storage component 13 or 23 stores electricity. In a case where the electricity storage is completed, the electricity supply for the electricity storage is cut off. Specifically, the presence of completion of the electricity storage may be determined using a sensor that senses the voltage, temperature or current of the energy storage component 13 or 23. The cutoff of the electricity supply may be performed using a switch (or circuit breaker) provided to a supply stage through which the electricity is supplied to the energy storage unit 13 or 23.

The electricity storage cost may be cost consumed in the electricity storage for a specific time period or electricity cost at a specific time.

As an example, in a case where the electricity storage cost is in an off-peak section (in a case where the specific component recognizes low-cost information which will be described later), the energy storage component 13 or 23 may store electricity. Alternatively, in a case where an on-peak section corresponds to an allowance section (in a case where the specific component recognizes high-cost information which will be described later), the energy storage component 13 or 23 may store in the on-peak section. In this instance, the allowance section is a section in which a power consumption information value is less than a predetermined reference. The power consumption information value may be a electricity cost, a power consumption amount, a time range, or the like. The predetermined reference may be a predetermined cost, a predetermined power consumption amount, a predetermined time, or the like. The predetermined reference may be a relative value or absolute value, and may be changed automatically or manually.

The energy storage component 13 or 23 may store a counter electromotive force generated when an energy consumption component that is rotatably operated or a motor provided to the energy consumption component is stopped (rotated).

Alternatively, the energy storage component 13 or 23 may store electricity using an energy consumption component that is rotatably operated or a motor provided to the energy consumption component. For example, in a case where the energy consumption component is a refrigerator, the energy storage component 13 or 23 may store electricity generated when a fan motor provided to the refrigerator is rotated (the fan motor may serve as a power generator or may be connected to the power generator). Alternatively, in a case where the energy consumption component is a washing machine, the energy storage component 13 or 23 may store electricity generated when a motor that rotates a drum for accommodating the laundry is rotated. In a case where the energy consumption component is a cooking appliance, the energy storage component 13 or 23 may store electricity generated when a motor for rotating a cooling fan is rotated. In a case where the energy consumption component is an air cleaner, the energy storage component 13 or 23 may store electricity generated when a motor for rotating a fan is rotated. That is, in this embodiment, in a case where a motor is provided regardless of the kind of the energy consumption component, the energy storage component 13 or 23 may store electricity generated when the motor is rotated. Alternatively, in a case where a power generator is connected to a fan rotated by the flow of air (natural flow or forcible flow), the energy storage component 13 or 23 may store electricity genereaged by the power generator.

The electricity stored in the energy component 13 or 23 may be supplied to one or more energy consumption components 26. In a case where electricity cost is higher than a reference value, the electricity stored in the energy component 13 or 23 may be supplied to the energy consumption component 26. As an example, in a case where the electricity cost is an on-peak (in a case where the specific component recognizes the high-cost information), the electricity stored in the energy storage component 13 or 23 may be supplied to the energy consumption component 26. In a case where the electricity cost is an off-peak (in a case where the specific component recognizes the low-cost information) but is close to the on-peak, the electricity stored in the energy storage component 13 or 21 may be supplied to the energy consumption component. If the electricity stored in the energy storage component 13 or 23 is less than a predetermined value, electricity generated in the energy generation component 11 is supplied to the energy consumption component. Thus, it is possible to prevent the operation of the energy consumption component from being stopped due to the cutoff of the electricity supply while the energy consumption component is operated.

In a case where the supply of electricity generated in the energy generation component 11 is cut off by interruption of electric power, the electricity stored in the energy component 13 or 23 may be supplied to the energy consumption component. In a case where the energy consumption component is an electric product, the electricity stored in the energy storage component 13 or 23 may be supplied to a communication unit or control unit provided to the electric product.

The electricity stored in the energy component 13 or may be supplied to a portion of a plurality of energy consumption components. As an example, the stored electricity may be supplied to an electric product such as a refrigerator required in continuous operation among a plurality of electric products. Alternatively, the stored electricity may be supplied to an energy consumption component with relatively low power among a plurality of energy consumption components that constitute one electric product. It will be apparent that the stored electricity is supplied to an energy consumption component with high power. Alternatively, when a course using a relatively small amount of power is performed among a plurality of courses in which an electric product is performed, the stored electricity may be supplied. It will be apparent that the stored electricity may be supplied even when a course using a large amount of power is performed.

Meanwhile, in a case where electricity is generated and stored by a fan or motor as described above, the electricity stored in the energy storage component 13 or 23 may be supplied to an energy consumption unit with relatively low power. As an example, the electricity stored in the energy storage component 13 or 23 may be supplied to an LED lamp, a display, a control unit, a communication unit, a low-power heater, or the like. Alternatively, in a case where the energy consumption component performs a plurality of courses, the electricity stored in the energy storage component 13 or 23 may be supplied to the energy consumption component in a course that requires low power.

The energy storage component 23 may be built in connected to one energy consumption component. Alternatively, a plurality of energy storage components 23 may be built in or connected to a plurality of energy consumption components, respectively. Alternatively, a plurality of energy storage components 23 may be built in or connected to one energy consumption component. The plurality of energy storage components 23 may be connected to one another to share the stored electricity.

Among the information related to energy, the on-peak information, the curtailment information and information on the deficiency of the amount of electricity supplied may be recognized as high-cost information considered that energy cost is relatively expensive. In this instance, the section in which the high-cost information is recognized by the specific component may referred to as a low-cost section.

On the other hand, among the information related to energy, the off-peak information, the energy increment information and the information on the excess of the amount of electricity supplied may be recognized as low-cost information considered that energy cost is relatively cheap. In this instance, the section in which the low-cost information is recognized by the specific component may be referred to as a low-cost section.

The information related to the fluctuation of the energy cost (high-cost or low-cost information) may be recognized as information for determining a power saving driving scheme of the specific component (e.g., the energy consumption component). That is, the information related to the fluctuation of the energy cost may be recognized by dividing a time slot (time period) based on energy cost or pricing period (pricing zone) for determining a driving scheme of the specific component into at least two or more.

A high period means a high price time period (period of high cost) or a high pricing period and a low period means a low price time period (period of low cost) and a low pricing period.

As an example, in a case where the information related to energy is recognized as a Boolean signal, the time slot (time period) based on energy cost or pricing period (pricing zone) for determining a driving scheme of the specific component may be divided into two. In a case where the information related to energy is divided into a plurality of levels or recognized as real-time information, the time period or pricing period may be divided into three or more.

Meanwhile, the information related to energy cost corresponding to at least time may be recognized as information for determining a power saving driving scheme of the specific component. That is, the information related to energy cost may be recognized by dividing a time slot (time period) or pricing zone (time period) into at least two or more. As described above, the divided time period or pricing period may be determined based on the kinds of the recognized information (the Boolean signal, the plurality of levels and the real-time information).

In other words, the information related to fluctuation of energy cost may be recognized by dividing a determination factor for driving the specific component into two or more, and functions on time and energy cost may be included in the determination factor.

In a case where the information related to energy cost is divided into two levels or more, the driving scheme of the specific component may be determined according to the information divided into levels.

On the other hand, in a case where the recognized information related to energy cost is not divided based on a specific reference (e.g., real-time cost information), it is compared with predetermined information, and the driving scheme of the specific component may be determined based on the compared result.

Here, the predetermined information may be reference information (e.g. reference value) for dividing the information related to energy cost, and the compared result may be whether not the information related to energy cost is more or less than the reference value.

Specifically, each of the kinds of information related to energy may be divided into first information 41 that is raw information, second information 42 that is refined information, and third information 43 that is information for performing the function of the specific component. That is, the first information is a raw data, the second information is a refined data, and the third information is a command for performing the function of the specific component.

The information related to energy is included a signal, and the signal is transmitted. In this instance, one or more of the first to third information may be transmitted several times while the content of the information is not converted but only the signal including the information is converted.

For example, as shown in FIG. 3, a component that receives a signal including the first information may convert only the signal and transmit a new signal including the first information to another component.

Therefore, it is described in this embodiment that the conversion of signal is a different concept from the conversion of information. In this instance, it can be readily understood that when the first information is converted into the second information, the signal including the first information is also converted into the signal including the second information.

However, the third information may be transmitted several times in the state that the content of the third information is converted or in the state that only the signal including the third information is converted while the content of the third information is identically maintained.

Specifically, in a case where the first information is raw information on time-based pricing, the second information may be refined information on the time-based pricing. The refined information on the time-based pricing is information in which the time-based pricing is divided into a plurality of levels or analysis information. The third information is a command generated based on the second information.

The specific component may generate, transmit or receive one or more of the first to third information. The first to third information are not necessarily transmitted or received in sequence. Only a plurality of pieces of third information without the first and second information may be transmitted in sequence or parallel. Alternatively, the first and third information may be transmitted or received together, the second and third information may be transmitted or received together, or the first and second information may be transmitted or received together.

As an example, in a case where the specific component receives the first information, it may transmit the second information or may transmit the second and third information.

In a case where the specific information receives only the third information, it may generate and transmit new third information.

Meanwhile, in the relation between two pieces of information, one is a message and the other is a response for the message. Thus, each of the components that constitute the network system may transmit or receive a message. In a case where each of the components receives a message, it may respond to the message. Therefore, in the case of an individual component, the transmission of a message is a relative concept with the response for the message.

The message may include a data (first or second information) and/or a command (third information).

The command (third information) may include a command for storing the data, a command for generating the data, a command for processing the data (including the generation of an additional data), a command for generating an additional command, a command for transmitting the additionally generated command, a command for transmitting a received command, and the like.

In this specification, the response for the received message means storage of the data, processing of the data (including generation of an additional data), generation of a new command, transmission of the newly generated command, simple transmission of a received command (including generation of a command for transmitting the received command to another component), operation, transmission of the stored information, transmission of an acknowledge message (acknowledge character or negative acknowledge character), or the like.

For example, in a case where the message is first information, the specific component that receives the first information may generate second information by processing the first information, or may generate the second information and new third information, as a response for the message.

The specific component that receives the message may provide a response related to energy. Here, the term "response" may be understood as a concept including an operation through which the specific component can perform a function. As an example, the HAN 20 may perform an operation related to energy by receiving a message.

The response (operation) related to energy, provided by the specific component, will be described in detail. For example, the specific component may be an energy consumption component.

The energy consumption component may be driven so that the energy cost when it is driven based on the recognition for energy information is reduced as compared with that when it is driven without the recognition for energy information.

The specific component may include a plurality of modes in which it is driven to perform its own function. The plurality of modes are a first mode and a second mode in which energy cost is relatively saved as compared with that in the first mode. The specific component may be driven in at least one of the first and second modes.

Here, the first mode may be a general mode and the second mode may be a power saving mode. Alternatively, the first and second modes may all be power saving modes.

The general mode may be understood as a mode in which the function of the specific component is performed without recognition of energy information. On the other hand, the power saving mode may be understood as a mode in which the function of the specific component is performed based on the recognition of energy information so as to save energy cost.

In a case where the first and second modes are power saving modes, the first mode may be specified as a driving scheme for saving energy cost and the second mode may be specified as a driving scheme in which the energy cost in the second mode is more saved than that in the first mode.

Meanwhile, in a case where the specific component (e.g., the energy consumption component) is driven, at least a portion is recognized in a driving scheme including at least drive time and course. In this case, an unrecognized portion may be generated so as to save energy cost, and a recognized portion may be converted into another scheme.

For example, at least a portion of the driving scheme may be recognized under the control of the energy management component, the control of the energy consumption component, or the like. In a case where a specific driving scheme is further required so as to save energy cost, an unrecognized portion of the driving scheme may be newly generated, and a recognized portion may be converted into another scheme so as to save energy.

It will be apparent that the process of generating the unrecognized portion may be omitted. In this case, the process of converting the recognized portion into another scheme. On the other hand, the process of converting the recognized portion into another scheme may be omitted. In this case, the process of newly generating the unrecognized portion may be performed.

The drive time may include a drive start time or drive end time. The course may include a drive period of the specific component and the power of the specific component.

The generated scheme or converted scheme may be a scheme recommended by the specific component so as to save energy cost. Here, the specific component may be an energy consumption component (control component) or the energy management component.

As an example, in a case where the recognized scheme is a specific drive time, the specific drive time may be converted into another time so as to save energy cost, and a specific course may be generated.

On the other hand, in a case where the recognized scheme is a specific course, the specific course may be converted into another course so as to save energy cost, and a specific time may be generated.

Under the control described above, a change in time or power may be made with respect to the output function of the specific component based on time.

The generated scheme or converted scheme may be performed within a set range. That is, in the process of recognizing at least a portion of the driving scheme, the generation or conversion of the driving scheme may be performed within a predetermined reference in which the recognized portion appears (e.g., restriction set by a user, constraint set under the control of the energy management component or energy consumption component, or the like).

Therefore, in a case where the set range is out of the predetermined reference, it is restricted to generate the unrecognized portion or to convert the recognized portion into another scheme.

Another embodiment is proposed.

Cost information may further included in the recognized driving scheme. That is, in a case where the cost information is recognized, a portion related to the drive time or course may be generated. The generated driving scheme may be recommended.

Meanwhile, a response of the specific component based on the information related to the fluctuation of the energy cost (high-cost or low-cost information), e.g., a power control for power saving driving, may be performed. An output decrease (including an output of zero) or output increase may be included in the output control.

It is as described above that the output is decreased or zero, maintained or increased based on the recognition for the information (on-peak or off-peak) related to energy cost.

If high-cost information is recognized, the output may be zero or decreased. Specifically, the output in the recognition of the high-cost information may be decreased as compared with that in the recognition of low-cost information. As described above, the decrease of the output may be previously determined before the specific component is operated, or may be changed when the high-cost information is recognized posterior to the start of the operation of the specific component.

In a case where the output of the specific component is zero or decreased, the function to be performed by the specific component may be lost as compared with a normal case. Therefore, a response for restoring the lost function may be performed.

As an example, after the output of the specific component is decreased, the specific component may be controlled so that the total operation time of the specific component is increased or so that the output is increased in at least a time period.

In other words, if specific reference information related to energy information is recognized in a period after the output of the specific component is controlled, the response for controlling the output may be released. Here, the term "period" may be divided based on a point of time when the high-cost information is recognized.

The total operation time may be understood as a time approaching a specific target in the process of performing the function of the specific component. As an example, in a case where the specific component is an electric appliance (washing machine, drying machine, cooking appliance or the like) intermittently driven (or driven in a specific course), the total operation time may be understood as a time until a corresponding course is completed.

On the other hand, in a case where the specific component is an electric appliance (refrigerator, water purifier, or the like) driven at normal times, the total operation time may be understood as a time approaching a target set for performing the function of the specific component. For example, the set target may be a target temperature, a target amount of ice produced, or a target amount of clean water in the refrigerator.

The total operation time may be increased as compared with the operation time set before the output of the specific component is decreased. In a case where the output of the specific component is not decreased, the total operation time may be increased as compared with the operation time of the specific component. However, although the total operation time of the specific component is increased, the specific component is controlled so that the total energy cost generated through the drive of the specific component can be saved as compared with that when the output of the specific component is not decreased.

If the high-cost information is recognized, the output of the specific component may be increased.

However, although the output is increased at a point of time when the high-cost information is recognized, the total output of the specific component during the entire driving period may be decreased or maintained as compared with that when the specific component is operated under a normal output. Alternatively, although the output is increased at a point of time when the high-cost information is recognized, the total power consumption or total time-based pricing of the specific component during the entire driving period may be decreased as compared with that when the specific component is operated under the normal output.

If the low-cost information is recognized, the output of the specific component may be increased. For example, in a case where the operation reservation of the specific component is set up, the driving of the specific component may be started before the setup time, or a component having a large output in a plurality of components may be first driven. In a case where the specific component is a refrigerator, supercooling may be performed by increasing an output as compared with the existing output. In a case where the specific component is a washing machine or a washer, hot water may be stored by driving a heater earlier than the time when the heater is to be operated. Alternatively, in a case where the specific component recognizes an off-peak signal (e.g., at a point of time of recognition), electricity may be stored.

Meanwhile, in a case of a specific condition (additional condition) is generated based on the information related to the fluctuation of the energy cost (high-cost or low-cost information), the response of the specific component, e.g., the output control for power saving driving, may be limited. That is, the output of the specific component may be maintained.

Here, the term "limitation" may be understood as the release of the output control performed or not performed.

The specific condition includes a case where influence on energy cost is minute even though the output control of the specific component is not performed or a case where it is necessary to prevent a function to be performed by the specific component from being degraded when the output of the specific component is controlled.

Whether or not the influence on the energy cost is minute may be determined based on a predetermined reference (time-based pricing, power consumption or information on operation time). The predetermined reference may be a relative or absolute value.

The case where the function to be performed by the specific component is degraded may be considered as a case where the specific component is a defrosting heater, for example.

In a case where it is controlled to decrease the output in a high-cost time period and to increase the output in the low-cost time period, the driving of the defrosting heater is more frequently performed than that during a normal time (setup period). In this case, the temperature of a storage room in the refrigerator is increased, and thus, the control of the output can be limited.

Meanwhile, the specific component 30 may include a display unit 31 for displaying information. In this embodiment, the term "information display" means that visual, auditory, olfactory and tactile information is known to the outside. The display unit 31 may include a touch screen for selecting or inputting information. Alternatively, the specific component 30 may include a separate input unit for inputting information by cable or radio.

All the information (energy information or additional information except the energy information) described above may be displayed in the display unit 31. One of the energy information and additional information may be displayed, or two or more pieces of information may be simultaneously displayed. That is, two or more pieces of information may be simultaneously displayed in the display unit 31. As an example, in a case where two or more pieces of information are simultaneously displayed, any one of the information is selected. Then, the selected screen may be enlarged, and the unselected screen may reduced. As another example, if any one of the two or more pieces of information is selected, the selected screen may be enlarged, and the unselected screen may disappear. In a case where specific information is selected and the selected screen is enlarged, information more specific that the previous information or information different from the previous information may be displayed on the enlarged screen. For example, in a case where the selected information is a character, graphic information may be displayed on the enlarged screen, or two or more pieces of information may be sequentially displayed on the enlarged screen. In a case where two or more pieces of information are displayed in the display unit 31, two or more relative positions may be varied.

Information except energy cost information and energy cost may be displayed in the display unit 31. The energy cost information may include current cost, past cost or estimated cost in the future. The energy cost information may include not only information on cost information in a specific period or time but also information on cost used with respect to the operation of a component, cost used in the present, cost to be used (estimation cost), or the like.

The information except the energy cost information may include information on energy reduction, emergency situation, grid safety, power generation quantity, operation priority, energy consumption, energy supply amount, information (e.g., cost change rate, average cost, level or the like) newly generated based on two or more pieces of information (one or more pieces of energy cost information and/or information except the one or more pieces of energy cost information), and the like. In this instance, the energy consumption may be energy consumption used two or more HANs, and may be simultaneously or selectively displayed.

The information on energy consumption may include information on past consumption, current consumption and estimated consumption in the future. The information on energy consumption may include information on accumulated consumption for a specific period (time), average consumption, increasing rate of consumption, decreasing rate of consumption, maximum consumption, minimum consumption, and the like.

The additional information may include one or more of environment information, time information, information related to the one or more components, information related to another component and information related to a user using the one or more components. The environment information may include one or more of information related to carbon dioxide emission rate, concentration of carbon dioxide in air, temperature, humidity, precipitation, presence of rainfall, amount of solar radiation, amount of wind.

In addition to the information described above, information refined based on at least one information or newly generated information may also be displayed in the display unit 31.

In a case where the specific component 30 is the energy storage component 13 or 23, the presence of use of the stored electricity, the remaining amount of the store electricity and the like may be displayed. If the remaining amount of the stored electricity is less than a predetermined value, alarm information may be displayed.

The information displayed in the display unit 31 may include one or more of information on number, character, sentence, figure, shape, symbol, image and light. The information displayed in the display unit 31 may include one or more of information on graph for each time or period, level, table. One or more of the shape, color, brightness, size, position, alarm period, alarm time of the information displayed in the display unit 31 may be varied.

A currently operable function (or menu) may be displayed in the display unit 31. Alternatively, among a plurality of functions, operable and inoperable function may be divided by size, color, position and the like, and then displayed in the display unit 31. Alternatively, in a case where separate input units are provided, only input units for selecting an operable function may be activated, or an input unit for selecting an operable function and an input unit for selecting an inoperable function may be displayed in different colors.

The target or display method of information displayed in the display unit 31 may be set and changed by a user, or may be changed automatically.

In a case where a condition for informing the user of information is satisfied, specific information may be displayed in the display unit 31. It will be apparent that a portion of a plurality pieces of information may be continuously displayed in the state that a component is turned on. The display time of the information may be changed or set automatically or manually.

If specific information (one or more pieces of information) is selected using the input unit, the selected information may be displayed. If a user contacts a portion of a component, e.g., an input unit, a handle, a display or the like, regardless of information display selection, or operates one or more buttons or knobs that constitute the input unit, a portion of the information may be displayed. In this instance, the information to be displayed may be set or changed. It will be apparent that a sensing unit for sensing a user's contact may be provided to the component. Alternatively, the specific information may be displayed by installation environment or variation of outdoor environment. Alternatively, the specific information may be displayed when the specific component receives new information. Alternatively, the specific information may be displayed when the kind or state of the specific component is changed. As an example, if a light emitting unit is turned off in an off-peak section and an on-peak section comes, the light emitting unit may be turned on. Alternatively, the specific information may be automatically displayed when the operation or state of the component is changed. As an example, in a case where the mode of the component is changed, information related to the changed mode may be automatically displayed.

Meanwhile, the display unit 31 may be separably connected or fixed to the component 30. In a case where the display unit 31 is separable from the component 30, it may perform wired or wireless communication with the component 30 (or control unit of the component). In a case where the display unit 31 is fixed to the component 30, it may also perform wired or wireless communication with the component 30.

In a case where the display unit 31 is separable from the component 30, a communication unit and an input unit for inputting or selecting information may be provided to the display unit 31. Thus, information can be inputted or selected through the input unit in the state that the display unit 31 is separated from the component 30. The communication unit may be provided to the component 30, and only the display unit 31 may be separated from the component 30. The display unit 31 may be the energy management component 24, the energy metering component 25 or the central management component 27, or may be a separate control apparatus.

In a case where the display unit 31 is provided with a communication unit, a communication unit may also be provided to the component 30. In a case where the display unit 31 and the component 30 are in the state that they are communicated with each other and information is transmitted/received through a communication signal, the display unit 31 may be used. That is, in a case where the intensity of a signal is secured so that information can be included in the communication signal, the display unit 31 may be in an available state. On the other hand, in a case where the display unit 31 is not communicated with the component 30 or information is not included in the communication signal due to the weak intensity of the signal, the display unit may be in an unavailable state. One of the display unit 31 and the component 30 transmits a communication signal, and the other of the display unit 31 and the component 30 transmits a response signal. The presence of use of the display unit 31 may be determined by the presence of reception of the communication and response signals and the signal intensity. That is, in a case where any one of the display unit 31 and the component 30 does not receive a signal or the intensity of received signal is less than a reference intensity, it may be determined that the display unit 31 is unavailable. Any one of the display unit 31 and the component 30 may increase the intensity of a transmission signal until it receives a response signal of which intensity is more than the reference intensity.

Information for informing the user of the presence of use of the display unit 31 may be displayed in the display unit 31 or the component 30. If it is recognized that the display unit 31 is unavailable, the component 30 may be controlled to increase its unique performance, to perform a door locking function or to limit its operation. Alternatively, the power of the component may be off while maintaining the power of a communication apparatus (modem) required to perform communication in the network system. Alternatively, the power of the component may be off while maintaining only a memory function for storing the state information of the component.

Meanwhile, sensors may be provided to the respective display unit 31 and component 30 so as to sense the presence of mounting of the display unit 31. As an example, the presence of mounting of the display unit 31 may be determined when the component 30 is operated. Each of the sensors may be a vibration sensor for sensing vibration. If the display unit 31 is mounted on the component 30, vibration generated in the operation of the component 30 can be transferred to the display unit 31. Therefore, in a case where the difference between the values of vibrations respectively sensed by the sensors is less than a predetermined value, it may be recognized that the display unit 31 is mounted on the component 30. If it is recognized that the display unit 31 is mounted on the component 30, the operation of the component 30 may be controlled so that vibration or noise generated in the operation of the component 30 is decreased. As an example, in a case where the component 30 is a washing machine or drier, the rotation speed of a motor may be decreased. In a case where the component 30 is a refrigerator, the driving period of a compressor may be decreased. On the contrary, if it is recognized that the display unit 31 is separated from the component 30, the component may be controlled to increase its unique performance, to perform a door locking function or to limit its operation.

As another example, each of the sensor may be a temperature sensor. In a case where the difference between the values of temperatures respectively sensed by the sensors is less than a predetermined value, it may be recognized that the display unit 31 is mounted on the component 30.

In the state that the display unit 31 is separated from the component 30, an auxiliary display unit may be provided to the component 30 so as to enable the operation of the component 30. The presence of operation of the auxiliary display unit may be determined based on the presence of use of the display unit 31. As an example, if the display unit 31 is separated from the component 30 or is unavailable, the auxiliary display unit may be turned on.

Figure 4:
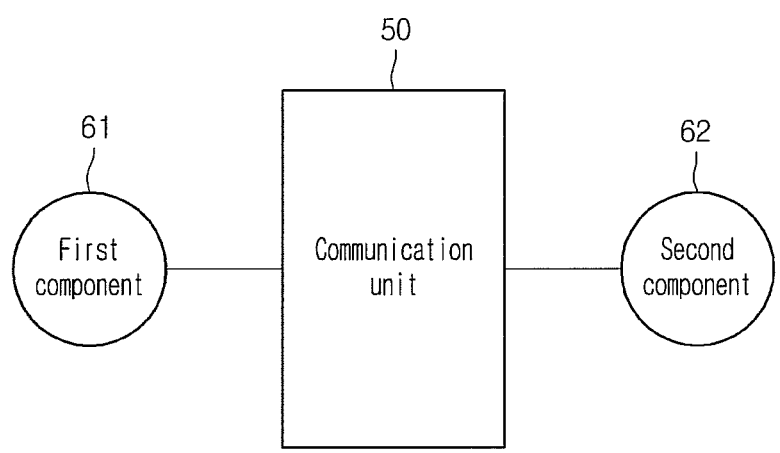
FIG. 4 is a view showing the communication structure of two components that constitute the network system according to a first embodiment.
Figure 5:
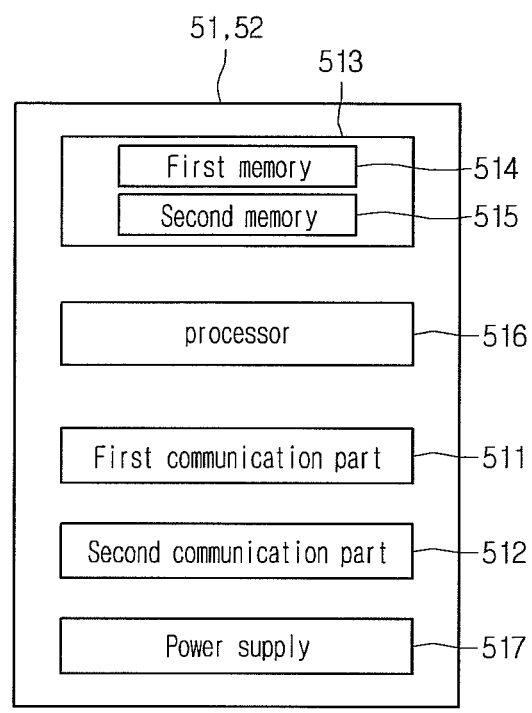
FIG. 5 is a block diagram showing the detailed configuration of a communication device that constitutes a communication unit.

FIG. 4 is a view showing the communication structure of two components that constitute the network system according to a first embodiment. FIG. 5 is a block diagram showing the detailed configuration of a communication device that constitutes a communication unit.

Referring to FIGS. 2, 4 and 5, first and second component 61 and 62 that constitute the network system may perform wired or wireless communication by means of a communication unit 50. The first and second components 61 and 62 may perform unidirectional or bidirectional communication.

In a case where the two components 61 and 62 perform wired communication, the communication unit 50 may be a simple communication line or power line communication means. It will be apparent that the power line communication means may include communicators (e.g., a modem or the like) respectively connected to the two components.

In a case where the two components 61 and 62 perform wireless communication, the communication unit 50 may include a first communicator 51 connected to the first component 61 and a second communicator 52 connected to the second component 62. In this case, the first and second communicators 51 and 52 perform wireless communication with each other.

As an example, if any one of the first and second communicators is powered on, one of the two communicators may transmit a network participation request signal, and the other of the two communicators may transmit a permission signal. As another example, if any one of the first and second communicators is powered on, the powered-on communicator may transmit a network participation request signal to a communicator previously participated in the network, and the communicator that receives the request signal may transmit a permission signal to the powered-on communicator.

In a case where a communicator that recognizes energy information determines that an error occurs in the received information in the state that a specific component participates in the network, the information is re-requested. For example, in a case where the first communicator receives energy information from the second communicator but an error occurs in the received information, the first communicator may request the second communicator to re-transmit the energy information. If the first communicator does not receive normal information for a predetermined time or number of times, it is determined that the first communicator has an error. In this case, information for informing a user of the error may be displayed in the first communicator or the first component 61.

The first component 61 may be a component that constitutes the UAN 10 or a component that constitutes the HAN 20.

The second component 62 may be a component that constitutes the UAN 10 or a component that constitutes the HAN 20.

The first and second components 61 and 62 may be the same kind of component or different kinds of components.

Components may be joined in the UAN 10 or the HAN 20.

Specifically, addresses may be assigned to a plurality of components, e.g., first and second components, respectively. Here, the addresses are necessary for performing communication between the components and can be mapped to at least a group.

The address may be understood as values respectively converted from the unique code of the first or second component. That is, at least a portion of the components that constitute the network system may have an unchangeable/unique code, and the code may be converted into an address for building a network.

In other words, product codes for at least some of the plurality of components capable of constituting first and second networks may be converted into different network codes based on the constituted networks.

As an example, the product code may be a unique code determined in production of electric appliances or a code separately provided for the registration of a network. The product code may be converted into an identity (ID) for identifying a network to which the electric appliance is to be registered.

The first and second networks may be networks that constitute the UAN 10 or networks that constitute the HAN 20. On the other hand, the first and second networks may be the UAN 10 and the HAN 20, respectively. Alternatively, the first and second networks may be the HAN 20 and the UAN 10, respectively.

A first component and a second component for allowing the first component to participate in the network may be included in the plurality of components that constitute the network. For example, the first component may be an electric appliance and the second component may be a server.

Any one of the first and second components transmits a request signal for participating in the network, and the other of the first and second components may transmit a permission signal.

That is, a signal may be transmitted/received between the first and second components, and whether or not to participate in the network may be determined based on the transmission time or number of the signal.

As an example, the first component transmits a test signal to the second component, and it is determined whether or not a response signal from the second component is transmitted to the first component. In a case where the response signal is not transmitted, the first component re-transmits the test signal, and it is re-determined whether or not a response signal from the second component is transmitted to the first component. By repeating such a process, if the transmission number of the test signal exceeds the setting number of the test signal, it may be determined that the second component does not participate in the network.

Meanwhile, the first component may transmit the test signal to the second component. If a response signal from the second component is not transmitted within a setup time, it may be determined that the second component does not participate in the network.

The first and second communicators 51 and 52 may have the same structure. Hereinafter, the first and second communicators 51 and 52 will be referred to as a communicator 51 and 52.

The communicator 51 and 52 may include a first communication part 511 for communication with the first component 61, a second communication part 512 for communication with the second component 62, a memory 513 for storing information received from the first component 61 and information received from the second component 62, a processor 516 for performing information processing, and a power supply 517 for supplying power to the communicator 51 and 52.

Specifically, the communication language (or scheme) of the first communication part 511 may be identical to or different from that of the second communication part 512.

Two kinds of information respectively received from the two components may be stored in the memory 513. The two kinds of information may be stored in a single sector or may be respectively stored in sectors. In any case, an area in which the information received from the first component 61 may be referred to as a first memory 514, and an area in which the information received from the second component 62 may be referred to as a second memory 515.

The processor 516 may generate first information or generate second and third information based on information received from the component or another communicator.

As an example, in a case where the communicator 51 and 52 receives the first information, it may generate information or sequentially generate the information and the second information by processing a data. Alternatively, in a case where the communicator 51 and 52 receives the first information, it may generate the second and third information by processing a data. In a case where the communicator 51 and 52 receives the third information, it may new third information.

For example, in a case where the second component is an energy consumption component (electric home appliance, component that constitutes the electric home appliance, or the like), the second communicator may generate a command for reducing energy consumption. In a case where the second component is an energy generation component, energy distribution component or energy storage component, the second communicator 52 may generate a command for energy generation time, generation amount, energy distribution time, distribution amount, energy storage time, storage amount or the like. In this case, the second communicator 52 serves as an energy management component.

The power supply 517 may receive electricity supplied from the components 61 and 62 or may receive electricity supplied from a separate power source. Alternatively, the power supply 517 may be a battery or the like.

Figure 6:
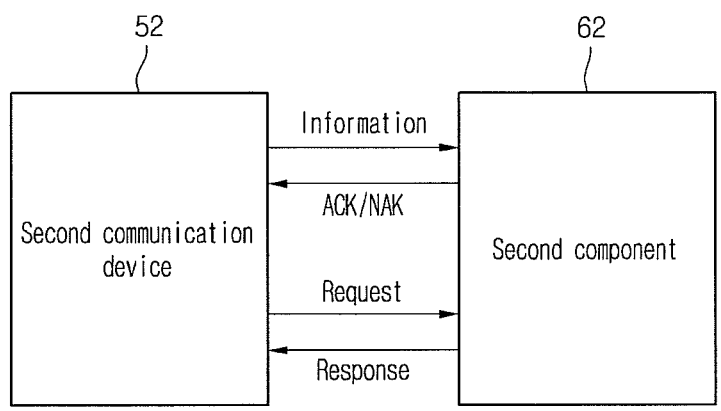
FIG. 6 is a view showing a communication performing process between a specific component and a communication device according to the first embodiment.

FIG. 6 is a view showing a communication performing process between a specific component and a communication device according to the first embodiment.

Hereinafter, for convenience of illustration, a communication performing process between the second component 62 and the second communicator 52 will be described as an example. A communication performing process between the first component 61 and the first communicator 51 may be identically applied to that between the second component 62 and the second communicator 62.

Referring to FIGS. 5 and 6, the second communicator 52 receives a message from the first communicator 51. The second communicator 52 may receive a message in real time or by periods without transmitting a request for the message to the first communicator 51, or may receive a message as a response for the request for the message to the first communicator 51. Alternatively, the second communicator 52 may receive a message by requesting information to the first communicator 51 at a point of time when it is initially turned on. Then, the second communicator 52 may receive information in real time or by periods from the first communicator 51 without a request for information.

The information received from the first communicator is stored in the memory 513. The second communicator 52 transmits a message to the second component 62 as a response for the message. In this instance, the message transmitted to the second component 62 relates to new information different from the information previously stored in the memory 513, or information generated in the processor 516.

Then, the second component 62 transmits an acknowledge character (ack) or negative acknowledge character (Nak) to the second communicator 52 as a response for the message. The second component 62 performs a function (generation of a command, operation, or the like) based on the received information, or waits for performing the function.

Meanwhile, the second communicator 52 requests component information to the second component 62 in real time or by periods. As an example, the component information may be component state information or information on a component unique code, a manufacturer, a service name code, an electricity use amount, and the like. Then, the second component 62 transmits component information to the second communicator 52 as a response for the request. The component information is stored in the memory 513 of the second communicator 52.

If the second communicator 52 receives a message for requesting the component information from the first communicator 51, it transmits the component information stored in the memory 513 to the first communicator 51 as a response for the message. Alternatively, the second communicator 52 transmits the component information stored in the memory 513 to the first communicator 51 in real time or by periods.

The second communicator 52 may transmit the information of the first component, stored in the memory, to the first component together with the information received from the first component. Alternatively, the second communicator 52 may transmit the information of the first component, stored in the memory, to the first component, separately from transmitting the information received from the first component.

The second communicator 52 stores the information of the second component 62 in the memory 513. Hence, in a case where the second communicator 52 receives a message for requesting the component information from the first communicator 51, it transmits the component information stored in the memory 513 directly to the first communicator 51 without a request for information to the second component 62, and thus, the communication load of the second component 62 can be reduced. That is, the second component becomes a virtual component.

Figure 7:
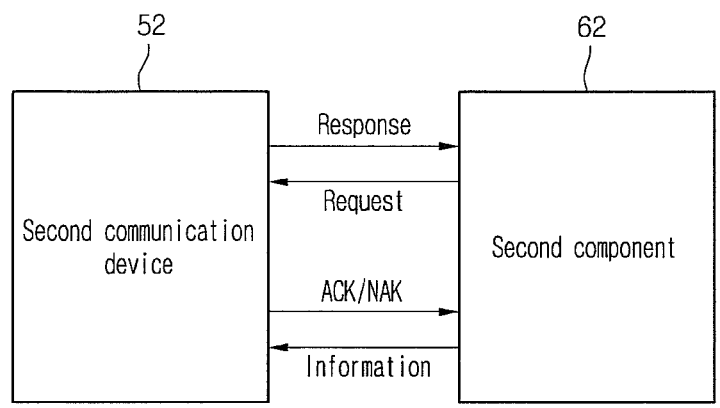
FIG. 7 is a view showing a communication performing process between a specific component and a communication device according to a second embodiment.

FIG. 7 is a view showing a communication performing process between a specific component and a communication device according to a second embodiment.

Hereinafter, for convenience of illustration, a communication performing process between the second component 62 and the second communicator 52 will be described as an example. A communication performing process between the first component 61 and the first communicator 51 may be identically applied to that between the second component 62 and the second communicator 62.

Referring to FIGS. 5 and 7, the second communicator 52 receives a message from the first communicator 51. The second communicator 52 may receive a message in real time or by periods without transmitting a request for the message to the first communicator 51, or may receive a message as a response for the request for the message to the first communicator 51. Alternatively, the second communicator 52 may receive a message by requesting information to the first communicator 51 at a point of time when it is initially turned on. Then, the second communicator 52 may receive information in real time or by periods from the first communicator 51 without a request for information.

If the second communicator 52 receives a message for requesting information from the second component 62, it transmits a message to the second component 62 as a response for the message for requesting the information. In this instance, the message transmitted to the second component 62 relates to new information different from the information previously stored in the memory 513, or information generated in the processor 516. Alternatively, the information transmitted to the second component 62 may be information received from the first component.

The second component 62 performs a function based on the received information or waits for performing the function.

Meanwhile, the second component 62 transmits component information to the second component 62 in real time or by periods. As an example, the component information may be component state information or information on a component unique code, a manufacturer, a service name code, an electricity use amount, and the like.

As described above, the electric use amount may be detected by the smart meter. In a case where the electricity use amount is included in the information of the second component 62, the correction of an actual electricity use amount may be performed by comparing the information of the second component 62 with the information of the smart meter.

Then, the second communicator 52 stores the information of the second component 62 in the memory 513, and transmits an acknowledge character (ack) or negative acknowledge character (Nak) to the second component 62 as a response for the message.

If the second communicator 52 receives a message for requesting component information from the first communicator 51, it transmits the information of the second component 62, stored in the memory 513, to the first communicator 51 as a response for the message. Alternatively, the second communicator 52 the information of the second component 62, stored in the memory 513, to the first communicator 51 in real time or by periods.

The second communicator 52 stores the information of the second component 62 in the memory 513. Hence, in a case where the second communicator 52 receives the message for requesting the component information from the first communicator 51, it transmits the information stored in the memory 513 directly to the first communicator 51 without transmitting a request for information to the second component 62, and thus, the communication load of the second component 62 can be reduced. That is, the second communicator 52 becomes a virtual component.

<Applications>

In the following descriptions, the first and second components may be reversed to each other, and therefore, overlapping descriptions will be omitted. For example, in a case where the first component is an electric home appliance and the second component is an energy management component, description in a case where the first component is an energy management component and the second component is an electric home appliance will be omitted.

Information transmitted/received by each of the components may be all the information described above. Particularly, specific information may be transmitted/received for each of the components.

The energy generation components 11 and 21 may transmit/receive information related to energy generation amount, and the like. The energy distribution components 12 and 22 may transmit/receive information related to energy distribution amount, distribution time, and the like. The energy storage components 13 and 23 may transmit/receive information related to energy storage amount, storage time, and the like. The energy metering components 15 and 25 may transmit/receive information related to energy consumption amount, and the like. The energy management components 14 and 24 may transmit/receive information related to energy generation, distribution, storage, consumption, cost, reliability, emergency situation, and the like.

(1) Case where second component is one component of HAN

The second component 62 may be an energy consumption component 26, e.g., a heater, motor, compressor, display or the like. In this case, the first component 61 may be a MICOM or energy consumption component 26 as an example. The MICOM or energy consumption component 26 may transmit a message for reducing energy consumption to another energy consumption component 26. Then, the another energy consumption component 26 may perform an operation for reducing energy, for example.

As another example, the energy consumption component 26 may be an electric home appliance. In this case, the first component 61 may be an energy storage component 23, an energy consumption component 26 (electric home appliance), an energy management component 24, an energy metering component 25, a central management component 27, a web server component 28, or a component that constitutes the UAN 10.

In this instance, an energy management function may be included or not included in the first component 61 except the energy management component 24.

In a case where an energy management function or solution is not included in the first component 61, it may be included in the communication unit or may be included in the MICOM of the second component 62. In this case, the energy management function is related to the consumption of energy.

As still another example, the second component 62 may be an energy generation component 21, an energy distribution component 22 or an energy storage component 23. In this case, the first component 61 may be an energy management component 24, a central management component 27, a web server component 28 or a component that constitutes the UAN 10.

A message may be transmitted to the second component 62. Here, the message may include energy generation time, generation amount or the like, energy distribution time, distribution amount or the like, and energy storage time, storage amount or the like.

In this instance, an energy management function may be included or not included in the first component 61 except the energy management component 24.

In a case where an energy management function or solution is not included in the first component 61, it may be included in the communication unit. In this case, the energy management function is related to the generation, distribution and storage of energy.

As still another example, the second component may be an energy metering component 25. In this case, the first component 61 may be a central management component 27, a web server component 28 or a component that constitutes the UAN 10.

An energy management function may be included or not included in the energy metering component. In a case where the energy management function is included in the energy metering component 25, the energy metering component 25 performs the same operation as the EMS.

In a case where an energy management function or solution is included in the energy metering component 25, it may be included in the communication unit or may be included in the second component 62.

As still another example, the second component 62 may be a central management component 27. In this case, the first component 61 may be a web server component 28 or a component that constitutes the UAN 10.

(2) Case where Second Component is One Component of UAN

The first component 61 may be a component that constitutes the UAN 10. In this case, the first and second components 61 and 62 may be the same kind of component or different kinds of components.

An energy management function may be included in the first component 61, the second component 62 or the communication unit.

The energy management function included in a specific component or the energy management function included in the energy management component 14 may be related to generation amount, distribution amount, storage amount, energy use amount of a component that constitutes the HAN 20.

In this specification, an example capable of constituting the network system has been described. However, any component not mentioned in this specification may be a first or second component that performs communication through the communication unit. For example, an automobile may be a second component, and the energy management component 24 may be a first component.

(3) Case where One of First and Second Components Communicates with Third Component Although the communication between two components has been described in the aforementioned examples, each of the first and second components may perform communication with one or more components (a third component to an n-th component).

In this case, the relation of the first or second component that performs communication with the third component and the like may be one of the aforementioned examples.

For example, the first component may be a component that constitutes the UAN, the second component may be an energy management component 24 that communicates with the first component, and the third component may be an energy consumption component 26 that communicates with the second component. In this instance, one or more of the three components may communicate with another component.

In this specification, the first to n-th components may be components that constitute the UAN or components that constitute the HAN. Alternatively, a portion of the components may be components that constitute the UAN, or another portion of the components may be components that constitute the HAN.

Hereinafter, third and fourth embodiments will be described. A difference between these embodiments and the aforementioned embodiments will be mainly described, and descriptions and reference numerals will be quoted to elements of these embodiments identical to those of the aforementioned embodiments.

Figure 8:
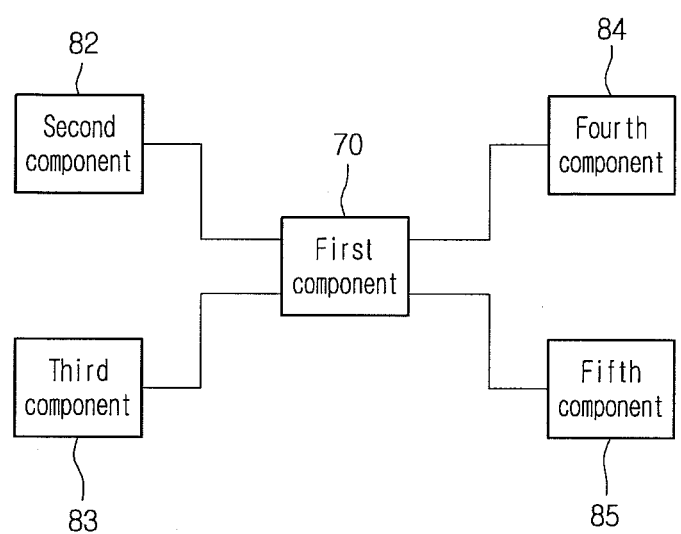
FIG. 8 is a view showing the communication structure of components that constitute the network system according to a third embodiment.
Figure 9:
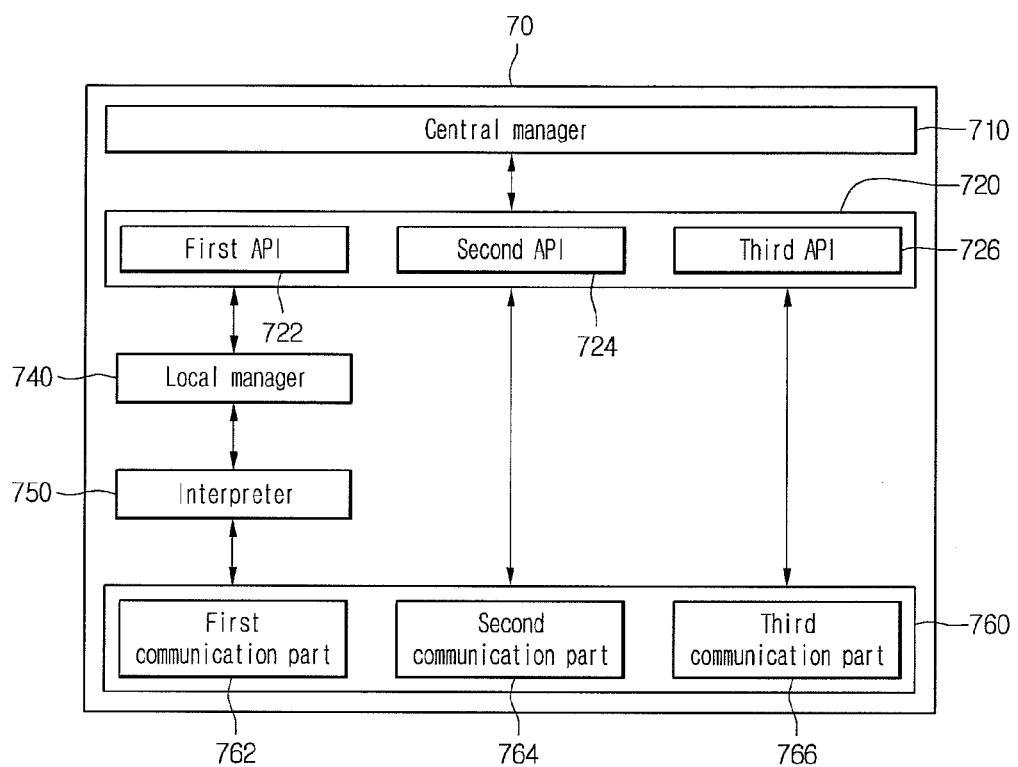
FIG. 9 is a block diagram showing the detailed configuration of a first component in FIG. 8.

FIG. 8 is a view showing the communication structure of components that constitute the network system according to a third embodiment. FIG. 9 is a block diagram showing the detailed configuration of a first component in FIG. 8.

Referring to FIGS. 8 and 9, a first component 70 may communicate with second to fifth components 82, 83, 84 and 85. Hereinafter, it will be described as an example that the first component 70 is a central management component (home server), the second and third components 82 and 83 are energy consumption components (electric home appliances), the fourth component 84 is an energy metering component (smart meter), and the fifth component 85 is a component that constitutes the UAN. The components may communicate with each other by means of a communication unit. In the network system illustrated in FIG. 8, each of the components is directly connected to the first component 70 to communicate with the first component 70. However, in a case where each of the components 82, 83, 84 and 85 is connected to new components to communicate with the new components, the network system may be extended and operated by the new components.

The second and third components 82 and 83 may be the same kind of component or different kinds of components. In this embodiment, it will be described as an example that the second and third components 82 and 83 are different kinds of energy consumption components.

The first component 70 may simply transmit information received from the fourth component 84 and/or the fifth component 85 to the second component 82 and/or the third component 83, or may process the received information and transmit the processed information.

The first component 70 may simply transmit information received from the second component 82 and/or the third component 83 to the fourth component 84 and/or the fifth component 85 (a signal may be converted), or may process the received information and transmit the processed information (the information is converted.

The first component 70 includes a communication unit 760 for performing communication with another component, a central manager 710 for managing the entire operation and/or information processing of the first component, and an application programming interface 720 (hereinafter, referred to as an "API" for performing an interface between the communication unit 760 and the central manager 710 (specifically, application software).

The communication unit 760 includes a first communication part 762 for performing communication with the second and third components 82 and 83, a second communication part 764 for performing communication with the fourth component 84, and a third communication part 766 for performing communication with the fifth component 85.

In this instance, the first and second communication parts 762 and 764 may use different communication protocols from each other. As an example, the first communication part 762 may use Zigbee and the second communication part 764 may use Wi-fi. In this embodiment, the kind of communication protocol or method used by the first and second communication parts 762 and 764 is not limited. The third communication component 766 may use Internet communication as an example.

The API 720 includes a first API 722, a second API 724 and a third API 726. The third API 726 is an interface between the central manager 710 and the third communication part 766, and the first API 722 is an interface between the first communication part 762 and the central manager 710. The second API 724 is an interface between the second communication part 762 and the central manager 710.

The first component 70 further includes a local manager 740 and an interpreter 750. In a case where the information to be transmitted/received between the API 720 and the communication unit 760 is information related to operations of energy consumption components (electric home appliances), the local manager 740 outputs information corresponding to the respective energy consumption components. The interpreter 750 interprets information transmitted from the local manager 740 to the communication unit 760 or information received in the communication unit 760. The information outputted from the interpreter 750 is used to set or get values of information related to the respective energy consumption components.

The local manager 740 includes a memory (not shown) in which information related to one or more energy consumption components is stored. Alternatively, the local manager 740 may be connected to a memory in which information related to one or more energy consumption components is stored. The information related to each of the energy consumption components may include operation information of each of the energy consumption components and information for controlling the energy consumption components. The information related to each of the energy consumption components may further include software download information for operating each of the energy consumption components and information for remote controlling/monitoring.

As an example, in a case where a plurality of energy consumption components include a washing machine, a refrigerator and a cooking appliance, information related to each of the energy consumption components is stored in the memory. The information related to each of the energy consumption components may be changed as components connected to the network system are changed.

If a signal is transmitted from the API 720 to the local manager 740, information corresponding to a specific energy consumption component is outputted. In a case where a plurality of energy consumption components exist, information on the plurality of energy consumption components is outputted. The interpreter 750 interprets the information transmitted from the local manager 740 into a machine language so as to transmit the information to the energy consumption components. The machine language may be a signal used to set or get the operation information of the energy consumption components.

The information transmission process in the first component 70 will be described.

As an example, the first component 70 may receive energy information (e.g., an energy reduction signal: first command) from the forth component 45 through the second communication part 764. The received energy information is transmitted to the central manager 710 through the second API 724. In the process of information transmission between the second API 724 and the central manager 710, only a signal including the information is converted, and the content of the information is not converted.

Since the energy information is information related to the energy consumption reduction of the energy consumption components, the central manager 710 transmits information (second command) related to operations of the energy consumption components to the API 720. As an example, the central manager 710 transmits information necessary for turning off power of the washing machine or refrigerator.

Then, the information is transmitted from the first API 722 to the local manager 740.

The local manager 740 transmits information (third command) for controlling the operation of each of the energy consumption components to the interpreter 750 based on the information transmitted from the first API 722. As an example, in a case where the information transmitted from the first API 722 is information having different kinds of energy consumption components as targets, the local manager 740 transmits information related to the control of each of the energy consumption components to the interpreter 750. In this case, since the local manager 740 receives the second command and outputs the third command, the information inputted to the local manager 740 is converted and outputted by the local manager 740.

Subsequently, the interpreter 750 interprets the information transmitted from the local manager 740 into a machine language (signal). Then, the converted signal is transmitted to the target energy consumption components (second and third components) through the first communication part 762. Then, the energy consumption components (second and third components) are finally turned off so as to reduce energy.

Although it has been described above that the first component receives information through the second communication part, the first component may receive information through the third component so that the information related to the energy consumption components is outputted.

Meanwhile, the second and third components 82 and 83 may transmit their own operation information to the first component 70. Since the information transmitted from the second and third components 82 and 83 is information related to operations of the energy consumption components, the signal received in the first communication part 762 is transmitted to the central manager 710 via the interpreter 750, the local manager 760 and the first API 722. In such an information transmission process, the information related to the second and third components 82 and 83 is stored in the local manager 740. In this embodiment, since the information related to the energy consumption components is stored in the local manager, the local manager may be understood as a virtual energy consumption component (abstraction model).

The central manager 710 may transmit the received information to the second communication part 764 and/or the third communication part 766.

The operation of the first component will be described. The information received through the communication unit 760 may be transmitted directly to the API 720, or may be converted (via the interpreter and the local manager) and then transmitted to the API 720, based on the kind of information (or the type of signal).

The information transmitted from the central manager 740 may be transmitted directly to the communication unit 760, or may be converted and then transmitted to the communication unit 760.

As another example, the interpreter may be included in the local manager 740, and the information received through the communication unit 760 is transmitted to the local manager 740. However, converted information may be outputted, or information may be outputted as it is without converting the information.

Meanwhile, in a case where the information transmitted to the API 720 through the second or third communication part 764 or 766 is information (raw data or refined data) related to time-based pricing, the central manager 710 determines the presence of on-peak time. In the case of the on-peak time, the central manager 710 may transmit the information (first command) for controlling the operations of the energy consumption components to the API 720. Then, the information is converted through the local manager 740, and the converted information (second command) is transmitted to the energy consumption components through the first communication part 762. Alternatively, the central manager 710 may transmit the information related to the time-based pricing to the first communication part 762 through the second API 724 without determining the presence of on-peak time. In this case, the information may be converted or not converted. That is, in a case where the central manager directly receives first information (raw data), it may transmit the first information as it is, or convert the first information into a second information (refined data) and then transmit the second information.

Figure 10:
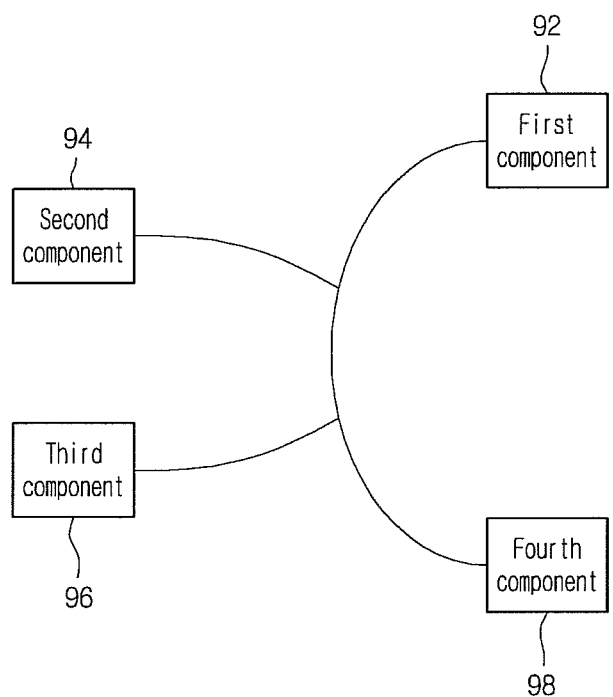
FIG. 10 is a view showing the communication structure of components that constitute the network system according to a fourth embodiment.
Figure 11:
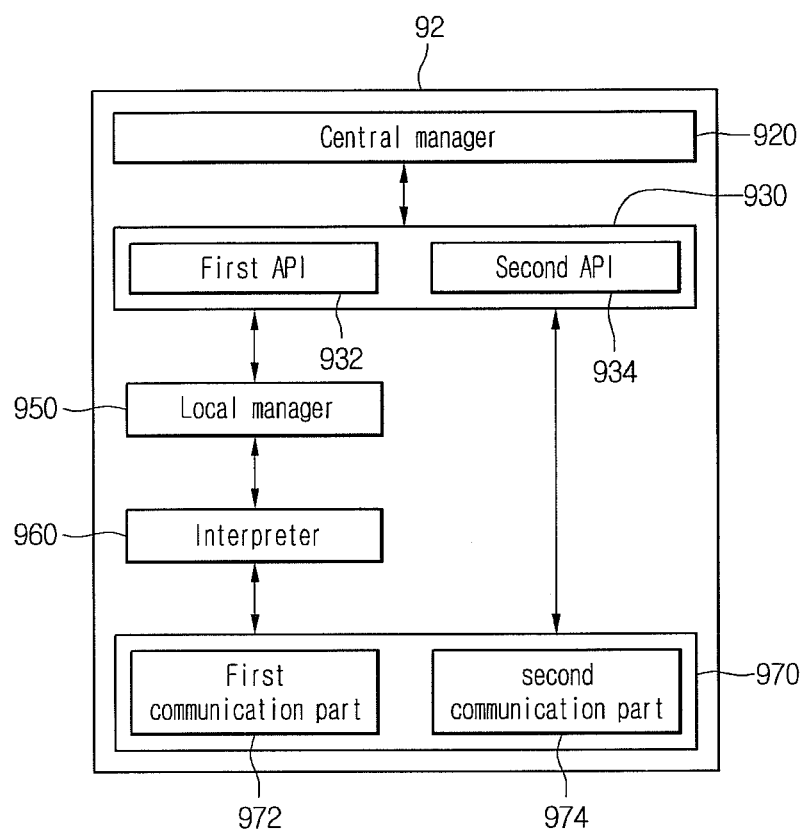
FIG. 11 is a block diagram showing the detailed configuration of a first component in FIG. 10.

FIG. 10 is a view showing the communication structure of components that constitute the network system according to a fourth embodiment. FIG. 11 is a block diagram showing the detailed configuration of a first component in FIG. 10.

Referring to FIGS. 10 and 11, the network system of this embodiment may include at least first to fourth components 92, 94, 96 and 98.

The first component 92 may communicate with the second to fourth components 94, 96 and 98. The fourth component 98 may communicate with the first to third components 92, 94 and 96.

Hereinafter, it will be described as an example that the first component 92 is a central management component (home server), the second and third components 94 and 96 are energy consumption components (electric home appliances), and the fourth component 98 is an energy metering component (smart meter).

The central management component (home server) may be understood as a component necessary for controlling at least a component that constitutes the HAN 20.

The first component 92 includes a communication unit 970 for performing communication with another component, a central manager 920 for managing the entire operation and/or information transmission/reception of the first component 92, and an application programming interface 930 (hereinafter, referred to as an "API") that serves as an interface between the communication unit 970 and the central manager 920 (specifically, application software).

The communication unit 970 may include a first communication component 972 for performing communication with the second to fourth components 94, 96 and 98, and a second communication component 974 for performing Internet communication.

The API 930 includes a first API 932 and a second API 934. The second API 934 is an interface between the central manager 920 and the second communication part 974, and the first API 930 is an interface between the first communication part 972 and the central manager 920.

The first component 92 further includes a local manager 950 and an interpreter 960. In a case where the information to be transmitted/received between the API 932 and the communication unit 970 is information related to operations of energy consumption components (electric home appliances), the local manager 950 outputs information corresponding to the respective energy consumption components. The interpreter 960 interprets information transmitted from the local manager 950 to the communication unit 970 or information received in the communication unit 970.

In this embodiment, the functions of the interpreter and the local manager are identical to those of the third embodiment, and therefore, their detailed descriptions will be omitted.

The information transmission process in the first component 92 will be described.

As an example, the first component 92 may receive energy information (e.g., energy reduction signal) from the fourth component 98 through the first communication part 972. Alternatively, the first component 92 may receive energy information from an external component connected to Internet through the second communication part 974.

The received energy information is transmitted directly to the first or second API 932 or 934 and then transmitted to the central manager 920. Since the energy information is information related to the energy consumption reduction of the energy consumption components, the central manager 920 transmits information related to the operations of the energy consumption components to the first API 932. As an example, the central manager 920 transmits information necessary for turning off power of a washing machine or refrigerator.

Then, the information is transmitted from the first API 932 to the local manager 950.

The local manager 950 transmits information for controlling the operation of each of the energy consumption components to the interpreter 960 based on the information transmitted from the first API 932. As an example, in a case where the information transmitted from the first API is information related to different kinds of energy consumption components, the local manager 950 transmits information related to the control of each of the energy consumption components to the interpreter 960.

Subsequently, the interpreter 960 interprets the information transmitted from the local manager 960 into a machine language (signal). Then, the interpreted signal is transmitted to the energy consumption components through the first communication part 972. Then, the energy consumption components are finally turned off so as to reduce energy.

Meanwhile, the second and third components 94 and 96 may transmit their own operation information to the first component 92. Since the information transmitted from the second and third components is information related to the operations of the energy consumption components, the signal received in the first communication part 972 is transmitted to the central manager 920 via the interpreter 960, the local manager 950 and the first API 932. In such an information transmission process, the information related to the first and second components is stored in the local manager 950.

The central manager 920 may transmit the received information to the first communication part 972. Then, the information of the second and third components 94 and 96 is transmitted to the fourth component 98.

The operation of the first component will be described. The information received through the communication unit 970 may be transmitted directly to the API 930, or may be converted (via the interpreter and the local manager) and then transmitted to the API 930, based on the kind of information (or the type of signal).

On the contrary, the information transmitted from the central manager 920 may be transmitted directly to the communication unit 970, or may be converted and then transmitted to the communication unit 970.

Meanwhile, in a case where the information transmitted to the API 930 through the second communication part 974 is information related to time-based pricing, the central manager 920 determines the presence of on-peak time. In the case of the on-peak time, the central manager 920 may transmit the information for controlling the operations of the energy consumption components to the API 930. Then, the information is transmitted to the energy consumption components through the local manager, the interpreter and the first communication part. In this case, the first component may be understood as an energy management component.

Although it has been described above that two energy consumption components communicate with the first component, the number of energy consumption components that communicate with the first component is not limited.

Although it has been described as an example that the first component is a home server, the first component may be an energy management component. In this case, the fourth component may be a central management component, an energy management component, a smart meter, or the like.

As another example, the first component may be a smart meter. In this case, the fourth component may be a central management component, an energy management component, or the like.

As still another example, the first component may be a terminal component (e.g., a gate way).

As still another example, each of the second and third components may be an energy generation component, an energy storage component or the like, which constitutes the HAN. That is, one or more of the energy generation component, the energy consumption component and the energy storage component may communicate with the first component. In addition to information related to the energy consumption component, information related to the energy generation component (e.g., information related to the operation of the energy generation component) and information related to the energy storage component (e.g., information related to the operation of the energy storage component) may be stored in the memory included in a local network or connected to the local network.

Although it has been described above that the first component performs Internet communication, the Internet communication may not be performed.

Although it has been described in the first embodiment that a single local manager is provided, a plurality of local managers may be provided. As an example, a first local manager may process information on an electric home appliance such as a refrigerator or washing machine, and a second local manager may process information on a display product such as a television or monitor.

Figure 12:
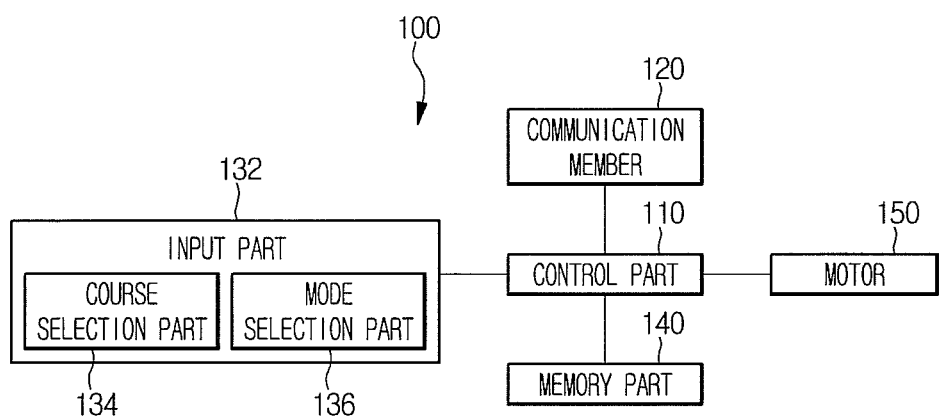
FIG. 12 is a block diagram illustrating a component constituting a home network according to a first embodiment.

FIG. 12 is a block diagram illustrating a component constituting a home network according to a first embodiment.

Hereinafter, a washing machine will be exemplified as the component.

Referring to FIG. 12, a component 100 according to the current embodiment includes: a control part 110; a communication member 120; an input part 132 for inputting an operation condition; a memory part 140 for storing energy information and additional information; and a motor 150 (or a component driver part) for rotating a drum accommodating a washing target.

The communication member 120 may communicate with a component constituting a home network, or a utility network. Also, the communication member 120 may communicate with the control part 110. The control part 110 may receive at least one of first to third information pieces through the communication member 120.

The control part 110 may recognize energy-related information, and control the motor 150 according to recognized information. That is, the control part 110 may recognize high price-related information or low price-related information. When the control part 110 recognizes high price-related information, the control part 110 may control an operation of the motor 150 to decrease energy consumption and/or energy price.

The input part 132 may include a course selection part 134 for selecting various washing courses, and a mode selection part 136 for selecting a normal mode and a power saving mode.

A washing course may be an operation of the component 100 in which a washing process, a rinsing process, and a dehydrating process are sequentially and automatically performed. In the washing process, a washing target is washed using washing water and detergent. In the rinsing process, washing water removes a detergent residue and a contaminant from the washing target. In the dehydrating process, washing water is removed from the washing target.

For example, the course selection part 134 may be a rotary knob. Printed matters corresponding to washing courses may be disposed around the rotary knob, so that a user can select one of the washing courses by rotating the rotary knob. The rotary knob includes LEDs corresponding to the washing courses, respectively. Thus, when a specific course is selected, an LED corresponding thereto emits light, so that a user can easily recognize the selected course.

Before an operation of the component 100 is started, the normal mode or the power saving mode may be selected using the mode selection part 136. Furthermore, while the component 100 is operated in a selected mode, the selected mode may be switched to the normal mode or the power saving mode.

The control part 110 may variously control the motor 150 during a washing course. That is, various types of driving including normal driving and spin driving may be performed on the drum. The normal driving is a drum driving motion (a tumbling motion or a general motion) in which a washing target is raised up and dropped down during a washing or rinsing operation of a typical drum washing machine. The spin driving is a drum driving motion (a spin motion) in which a washing target attached to an inner portion of the drum is continually rotated during a dehydrating operation.

According to the current embodiment, a drum driving motion includes a revolutions per minute (RPM) speed of the drum and a motion of a washing target within the drum according to the RPM speed.

Figure 13:
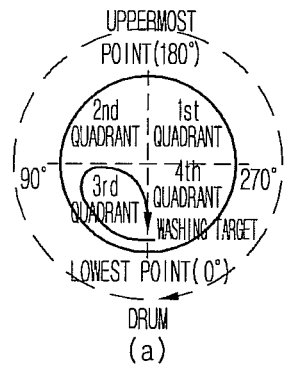
FIGS. 13A to 13G are views illustrating drum driving motions of a component according to the first embodiment.
Figure 13:
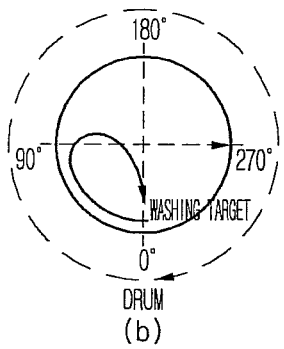
Figure 13:
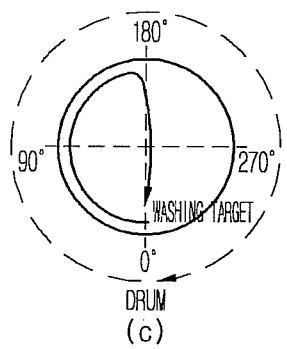
Figure 13:
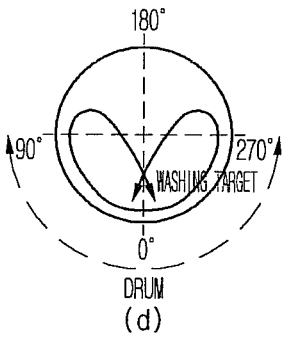
Figure 13:
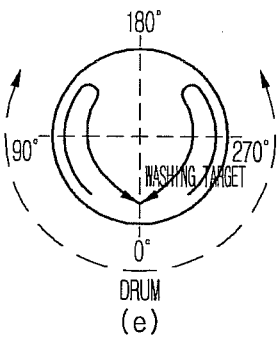
Figure 13:
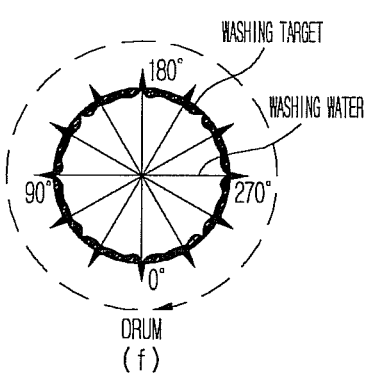
Figure 13:
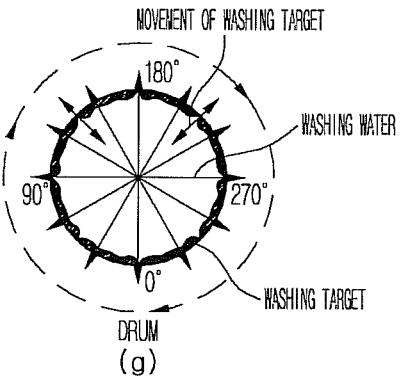
Figure 14:
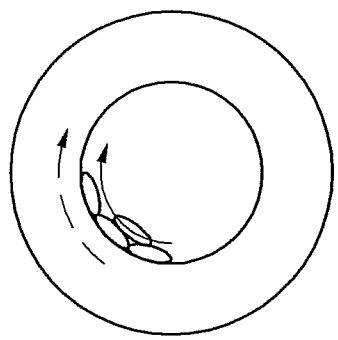
FIGS. 14A to 14D are views illustrating the step motion of FIG. 13C.
Figure 14:
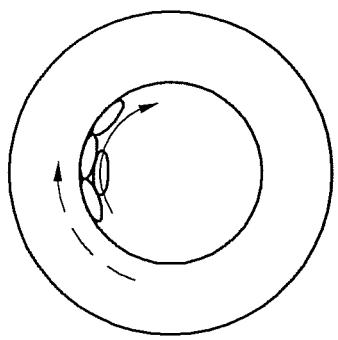
Figure 14:
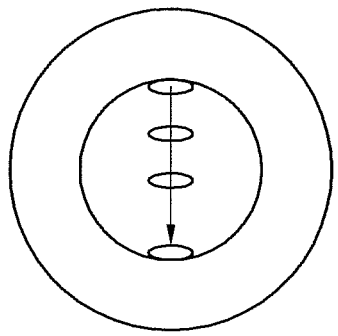
Figure 14:
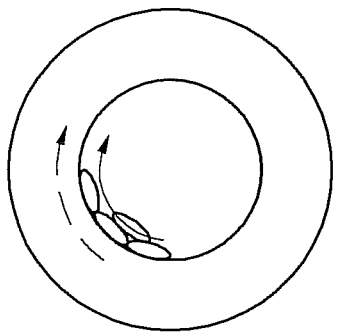
Figure 15:
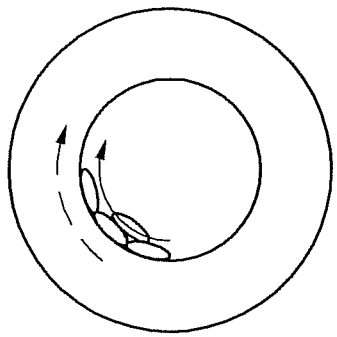
FIGS. 15A to 15F are views illustrating the scrub motion of FIG. 13E.
Figure 15:
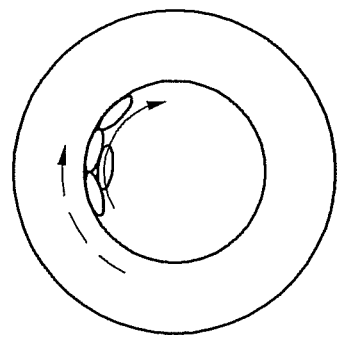
Figure 15:
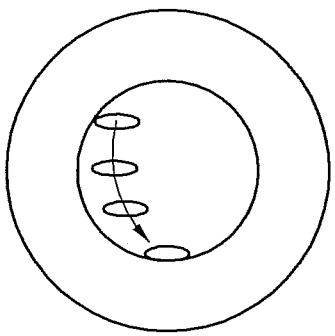
Figure 15:
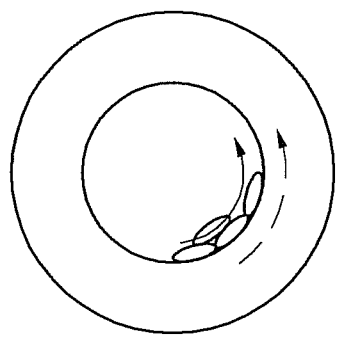
Figure 15:
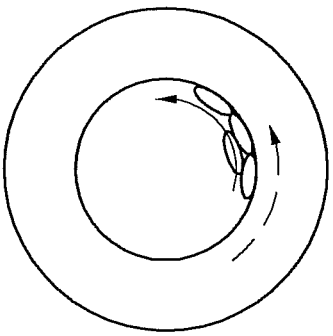
Figure 15:
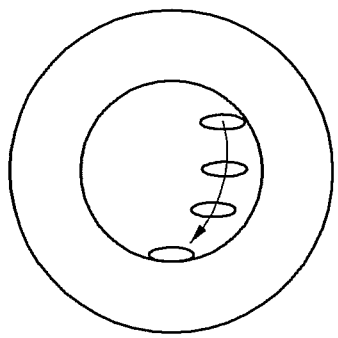

FIGS. 13A to 13G are views illustrating drum driving motions of a component according to the current embodiment. In particular, FIG. 13A is a view illustrating a rolling motion. FIG. 13B is a view illustrating a tumbling motion. FIG. 13C is a view illustrating a step motion. FIG. 13D is a view illustrating a swing motion. FIG. 13E is a view illustrating a scrub motion. FIG. 13F is a view illustrating a filtration motion. FIG. 13G is a view illustrating a squeeze motion.

Referring to FIGS. 13A to 13G, drum driving motions are combinations of rotation directions and rotation speeds of the drum, and a drop direction and a drop time point of a washing target in the drum are varied according to the drum driving motions, thereby varying movement of the washing target in the drum. The drum driving motions are performed by controlling the motor 150.

When the drum is rotated, a washing target is raised by a lift (not shown) disposed on the inner circumferential surface of the drum. Thus, impact applied to a washing target can be varied by controlling a rotation speed and a rotation direction of the drum. That is, mechanical force such as friction between washing targets, friction between a washing target and washing water, and drop impact of a washing target can be varied. In other words, a degree of beating or rubbing a washing target, and a degree of dispersing or overturning washing targets can be varied.

As such, an component according to the current embodiment can vary a drum driving motion, depending on the type of a washing target, a contaminated degree of the washing target, each process of the component, and detail operations constituting each process. Thus, the washing target can be treated using optimal mechanical force. Accordingly, the washing target is washed more efficiently. In addition, an increase of washing time due to an unvaried drum driving motion is prevented.

The motor 150 may be a direct connection type motor to perform various drum driving motions. For example, a stator of a motor may be fixed behind a tub (not shown, which is disposed outside of a drum, and a detailed description thereof will be omitted since the tub is a typical configuration), and the drum may be directly driven by rotation of a rotor of the motor. In this case, a time delay or backlash is maximally prevented by controlling a rotation direction and torque of the motor. Thus, a drum driving motion can be quickly controlled.

When torque of a motor is transmitted to a rotation shaft through a member such as a pulley, a drum driving motion in which a time delay or backlash is allowed, for example, tumbling driving or spin driving can be performed. Since methods of driving a motor and a drum would be obvious to a person skilled in the art, a description thereof will be omitted.

Referring to FIG. 13A, in a rolling motion, the motor 150 rotates the drum in a rotation direction, and a washing target located on the inner circumferential surface of the drum is controlled to be dropped to the lowest point of the drum from a region within about 90 degrees in the rotation direction of the drum.

That is, when the motor 150 rotates the drum, e.g., at about 40 RPM, a washing target located at the lowest point of the drum is raised to a predetermined height in a rotation direction of the drum and is then returned through rolling-like movement to the lowest point of the drum from a position that is within about 90 degrees in the rotation direction of the drum from the lowest point thereof. As illustrated in FIG. 13A, when the drum rotates clockwise (on the basis of FIG. 13A), washing targets continually roll in a third quadrant of the drum.

In the rolling motion, washing targets are washed through friction between the washing targets, friction between the washing targets and washing water, and friction between the washing targets and the inner circumferential surface of the drum. In addition, a washing target is sufficiently overturned in the rolling motion, which provides a smooth rub effect.

In this case, an RPM speed of the drum is determined according to the radius of the drum. In particular, when the drum is rotated, centrifugal force is applied to a washing target in the drum. Movement of the washing target in the drum is varied according to the difference between the centrifugal force and the force of gravity. In addition, the movement of the washing target is affected by torque of the drum and frictional force between the drum and the washing target. Thus, in the rolling motion, an RPM speed of the drum is determined such that the centrifugal force and the friction force are smaller than the force of gravity (1G).

Referring to FIG. 13B, in a tumbling motion, the motor 150 rotates the drum in a rotation direction, and a washing target located on the inner circumferential surface of the drum is controlled to be dropped to the lowest point of the drum from a region within about 90 to 110 degrees in the rotation direction of the drum.

That is, a washing target put in the drum is located at the lowest point of the drum before the motor 150 is driven. When the motor 150 provides torque to the drum, the drum is rotated, and the lift disposed on the inner circumferential surface of the drum moves the washing target from the lowest point of the drum to a predetermined height. For example, when the motor 150 rotates the drum at about 46 RPM, a washing target is dropped to the lowest point of the drum from a region that is within about 90 to 110 degrees in a rotation direction of the drum from the lowest point thereof.

An RPM speed of the drum is determined such that centrifugal force generated in the tumbling motion is greater than that of the rolling motion and is smaller than the force of gravity. As illustrated in FIG. 13B, when the drum is rotated clockwise in the tumbling motion, a washing target is moved from the lowest point of the drum to a portion of a second quadrant of the drum through the third quadrant and is then dropped from the inner circumferential surface of the drum to the lowest point of the drum.

Accordingly, the washing target is washed by friction with washing water and impact due to the drop, and thus, is washed and rinsed using mechanical force greater than that of the rolling motion. In addition, since washing targets are spaced a predetermined distance from the inner circumferential surface of the drum before the washing targets are dropped, the washing targets are separated from each other and are dispersed.

Referring to FIG. 13C, in a step motion, the motor 150 rotates the drum in a rotation direction, and a washing target located on the inner circumferential surface of the drum is controlled to be dropped to the lowest point of the drum from the uppermost point (at about 180 degrees) in the rotation direction of the drum.

For example, when the motor 150 rotates the drum at about 60 RPM or higher, centrifugal force prevents a washing target from being dropped while the washing target is rotated. As such, the drum is rotated at a speed such that centrifugal force prevents a washing target from being dropped from the inner circumferential surface of the drum, and then the drum is quickly stopped, to thereby maximize impact applied to the washing target.

The motor 150 is controlled to rotate the drum at a speed (about 60 RPM or higher) such that centrifugal force prevents a washing target from being dropped from the inner circumferential surface of the drum, and then to provide reverse torque to the drum when the washing target approaches the uppermost point of the drum (at 180 degrees in the rotation direction).

Thus, after the washing target is lifted in the rotation direction from the lowest point of the drum, just when the drum is stopped by the reverse torque from the motor 150, the washing target is dropped from the uppermost point to the lowest point. Thus, in the step motion, a washing target located in the drum is washed by impact generated when a drop distance of the washing target is maximized. Mechanical force generated in the step motion is greater than the mechanical force of the rolling motion or the tumbling motion.

As illustrated in FIG. 13C, the drum is rotated clockwise in the step motion, a washing target is moved from the lowest point of the drum to the uppermost point of the drum through the third and second quadrants and is then suddenly dropped from the inner circumferential surface of the drum to the lowest point of the drum. As such, the step motion maximizes the drop distance of a washing target in the drum. Thus, when a laundry amount is small, the step motion can provide mechanical force more effectively.

The motor 150 may undergo an opposite phase brake process for stopping the drum. In the opposite phase brake process, a motor is stopped by generating torque in a direction opposite to a rotation direction of the motor. To this end, a phase of current supplied to the motor may be reversed. The opposite phase brake process can quickly stop a motor. Thus, the opposite phase brake process is most appropriate for the step motion that provides strong impact to a washing target.

After the opposite phase brake process, the motor 150 applies torque to the drum to lift the washing target from the lowest point to the uppermost point. That is, in the step motion, clockwise torque is applied to the drum, then, counterclockwise torque for quickly stopping the drum is momentarily applied thereto, and then, clockwise torque is applied again to the drum.

As a result, in the step motion: when the drum rotates, a washing target is washed by friction with washing water introduced through an opening of the drum; and when the washing target arrives at the uppermost point, the washing target is dropped to be washed by impact.

Referring to FIG. 13D, in a swing motion, the motor 150 rotates the drum in both rotation directions, and a washing target is controlled to be dropped from regions located at about 90 degrees in the rotation directions of the drum.

That is, when the motor 150 rotates the drum counterclockwise, e.g., at about 40 RPM, a washing target located at the lowest point of the drum is lifted counterclockwise to a predetermined height.

When the washing target is lifted to a region located at about 90 degrees counterclockwise, the motor 150 stops the drum to move the washing target to the lowest point.

After that, the motor 150 rotates the drum clockwise, e.g., at about 40 RPM, and the dropped washing target is lifted clockwise to a predetermined height. When the washing target is lifted to a region located at about 90 degrees clockwise, the motor 150 stops the drum to move the washing target to the lowest point.

That is, in the swing motion, a rotation of the drum in a direction, a stop of the drum, a rotation of the drum in a reverse direction, and a stop of the drum are repeated. As illustrated in FIG. 3D, an operation in which a washing target is lifted from the third quadrant of the drum to a portion of the second quadrant and is then gently dropped, and an operation in which the washing target is lifted from a fourth quadrant of the drum to a portion of a first quadrant thereof and is then gently dropped may be repeated.

At this point, the motor 150 undergoes a generator brake process to minimize a load applied to the motor 150 and mechanical abrasion thereof and adjust impact to a washing target.

In the generator brake process, a motor functions as a generator by means of rotational inertia by cutting off current applied to the motor. When the current applied to the motor is cut off, the direction of current flowing through a coil of the motor is reversed from the direction before the cutting off. Accordingly, force is generated in a direction of interrupting a rotation of the motor (according to Fleming's right hand rule), thereby stopping the motor. Unlike the opposite phase brake process, a motor is not quickly stopped in the generator brake process, but a rotation direction of the drum is smoothly changed.

Thus, in the swing motion as illustrated in FIG. 13D, a washing target is moved in a horizontal eight shape within both the third and fourth quadrants.

The swing motion may be performed at least one time in a wool course, a delicate course, or a sportswear course. The wool course is used to wash a hand-washable target formed of wool. The delicate course is used to wash a garment including an accessory, a metal ornament or delicate fibers such as silk or plastic fibers. The sportswear course is used to wash a washing target formed of a functional material having excellent perspiration absorbing performance and permeability, such as a hiking outfit or sportswear.

If such a washing target is washed using great mechanical force, the washing target may be damaged. Thus, the washing target may be gently washed using the swing motion.

Referring to FIG. 13E, in a scrub motion, the motor 150 rotates the drum in both rotation directions, and a washing target is controlled to be dropped from regions located at about 90 degrees or greater in the rotation directions of the drum.

That is, when the motor 150 rotates the drum counterclockwise, e.g., at about 60 RPM, a washing target located at the lowest point of the drum is lifted counterclockwise to a predetermined height. When the washing target is passed by a region located at about 90 degrees counterclockwise, the motor 150 provides reverse torque to the drum to temporarily stop the drum. Accordingly, the washing target is quickly dropped from the inner circumferential surface of the drum.

After that, the motor 150 rotates the drum clockwise, e.g., at about 60 RPM, and the dropped washing target is lifted clockwise to a predetermined height. When the washing target is passed by a region located at about 90 degrees clockwise, the motor 150 provides reverse torque to the drum to temporarily stop the drum. Accordingly, the washing target is dropped to the lowest point from the region located at about 90 degrees clockwise on the inner circumferential surface of the drum.

Thus, the scrub motion washes a washing target by quickly dropping the washing target from a predetermined height. The motor 150 may undergo an opposite phase brake operation for stopping the drum.

Since a rotation direction of the drum is quickly changed, a washing target is not significantly moved away from the inner circumferential surface of the drum, which provides a strong scrub effect. In the scrub motion, an operation in which a washing target is lifted from the third quadrant of the drum to a portion of the second quadrant and is then quickly dropped, and an operation in which the washing target is lifted from the fourth quadrant of the drum to a portion of the first quadrant and is then dropped are repeated. Thus, as illustrated in FIG. 13E, a lifted washing target is repeatedly moved downward along the inner circumferential surface of the drum.

Referring to FIG. 13F, in a filtration motion, washing water is injected into the drum and the motor 150 rotates the drum such that centrifugal force prevents a washing target from being dropped from the inner circumferential surface of the drum.

That is, a washing target is spread and then tightly contacts the inner circumferential surface of the drum. In this state, the drum is rotated, and washing water is injected into the drum. Accordingly, centrifugal force discharges the washing water to the tub through the washing target and through holes of the drum. Thus, the filtration motion increases a surface area of a washing target, and passes washing water through the washing target, thereby uniformly supplying the washing water to the washing target.

Referring to FIG. 13G, in a squeeze motion, an operation, in which the motor 150 rotates the drum such that centrifugal force prevents a washing target from being dropped from the inner circumferential surface of the drum, and an operation, in which a rotation speed of the drum is decreased to remove the washing target from the inner circumferential surface of the drum, are repeated, and washing water is injected into the drum during the rotation of the drum.

That is, the filtration motion continually rotates a washing target at a constant speed without a drop of the washing target to the inner circumferential surface, whereas the squeeze motion varies a rotation speed of the drum to repeat tight contact of a washing target with the inner circumferential surface and removal of the washing target from the inner circumferential surface.

Although a process of injecting washing water into the drum in the filtration motion and the squeeze motion is not shown, a circulation passage and a pump may be used for the process. The pump may communicate with a bottom surface of the tub to press washing water, and the circulation passage may have an end connected to the pump and another end for injecting washing water from the upper side of the drum to the inside of the drum.

Since the circulation passage and the pump are used for injecting washing water stored in the tub, an injection water supply passage connected to a water supply source outside of a cabinet may be used to inject washing water into the drum.

That is, a side portion of the injection water supply passage may be connected to a water supply source, and another side thereof may be connected to the tub, and a nozzle may inject washing water into the drum. In this case, washing water can be injected into the drum during the filtration motion and the squeeze motion.

FIGS. 14A to 14D are views illustrating the step motion of FIG. 13C.

Referring to FIGS. 14A to 14D, when the motor 150 applies torque to the drum in a predetermined rotation direction, the drum is rotated in the predetermined rotation direction. Accordingly, a washing target is lifted, tightly contacting the inner circumferential surface of the drum. At this point, the drum may be rotated, e.g., at about 60 RPM or higher such that the washing target is lifted, tightly contacting the inner circumferential surface of the drum. In this case, the rotation speed of the drum is determined according to the inner diameter of the drum, and is determined such that centrifugal force is greater than the force of gravity. Just before the washing target arrives at the uppermost point of the drum after a region located at about 90 degrees in the rotation direction of the drum, the motor 150 undergoes the opposite phase brake process for temporarily stopping the drum.

Since an opposite phase brake time point of the motor 150 is closely connected to a position of a washing target in the drum, a device for determining or predicting a position of a washing target may be provided. For example, a sensing device including a hall effect sensor for determining a rotation angle of the rotor may be provided. The control part 110 can determine not only a rotation angle of the rotor but also a rotation direction thereof, by using the hall effect sensor. This would be obvious to a person skilled in the art, and thus a detail description thereof will be omitted.

The control part 110 determines a rotation angle of the drum, by using the sensing device, and controls the motor 150 to undergo the opposite phase brake process before the drum arrives at a region located at about 180 degrees.

Accordingly, the drum rotating clockwise is temporarily stopped. At this point, a rotation angle of the drum is substantially about 180 degrees, and the washing target is dropped from the uppermost point to the lowest point. After that, current is continually applied to continually rotate the drum clockwise.

Although the drum is rotated clockwise in FIGS. 14A to 14D, the drum may be rotated counterclockwise for the step motion. Since the step motion applies a great load to the motor 150, it may be needed to decrease an actual operation rate.

The actual operation rate is a ratio of driving time of a motor to the sum of the driving time and stop time of the motor. When the actual operation rate is 1, a motor is driven without a stop. For example, the actual operation rate may be about 70% according to a load to the motor 150 in the step motion, and the motor 150 may be driven for about 10 seconds and be stopped for about 4 seconds.

FIGS. 15A to 15F are views illustrating the scrub motion of FIG. 13E.

Referring to FIGS. 15A to 15F, when the motor 150 applies torque to the drum, a washing target is rotated clockwise in the drum. At this point, the motor 150 may be controlled to rotate the drum, e.g., at about 60 RPM or higher such that the washing target is rotated, tightly contacting the inner circumferential surface of the drum. After that, when the washing target passes by a region located at about 90 degrees clockwise, the motor 150 undergoes the opposite phase brake process. Accordingly, the washing target tightly contacting the inner circumferential surface of the drum is dropped to the lowest point of the drum.

Then, the motor 150 provides counterclockwise torque to the drum. Accordingly, the dropped washing target is rotated counterclockwise, tightly contacting the inner circumferential surface of the drum, and is located between the uppermost point of the drum and a region located at about 90 degrees counterclockwise from the lowest point. At this point, the motor 150 undergoes the opposite phase brake process. Accordingly, the washing target tightly contacting the inner circumferential surface of the drum is dropped to the lowest point of the drum.

Like the step motion, since the scrub motion also applies a great load to the motor 150, it may be needed to decrease an actual operation rate. For example, the motor 150 may be driven for about 10 seconds and be stopped for about 4 seconds such that the actual operation rate may be about 70%.

Although not shown, the swing motion may be performed by changing the opposite phase brake process of the scrub motion into the generator brake process, and setting a generator brake time point to a time point when a washing target arrives at a region located at 90 degrees in a rotation direction of the drum. Thus, a detailed description thereof will be omitted.

Figure 16:
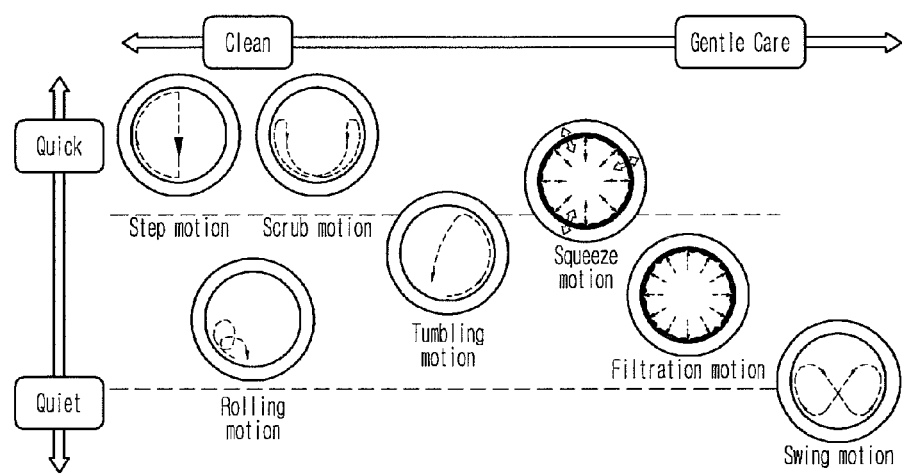
FIG. 16 is a graph illustrating cleaning performances and vibration levels of the motions of FIGS. 13A to 13G.

FIG. 16 is a graph illustrating cleaning performances and vibration levels of the motions of FIGS. 13A to 13G.

Referring to FIG. 16, a horizontal axis denotes cleaning performance, and efficiency of removing a contaminant from a washing target is increased toward the left side of the horizontal axis. A vertical axis denotes vibration or noise level, and vibration level is increased toward the upper side of the vertical axis, whereas washing time for a washing target is decreased toward the upper side of the vertical axis.

The step motion and the scrub motion are excellent in cleaning performance and are thus appropriate to a severely contaminated washing target or a washing course for decreasing washing time. The step motion and the scrub motion have high vibration and noise level and are thus inappropriate to a delicate washing target or a washing course requiring minimized vibration and noise level.

The rolling motion is excellent in cleaning performance and has low vibration level. In addition, the rolling motion minimizes damage to a washing target and decreases load to a motor. Thus, the rolling motion can be applied to any washing course, particularly, to a course of dissolving a detergent in an initial washing stage and a course of soaking a washing target.

The cleaning performance of the tumbling motion is lower than that of the scrub motion, and the vibration level thereof is between those of the scrub motion and the rolling motion. The rolling motion has low vibration level, but washing time thereof is longer than that of the tumbling motion. Thus, the tumbling motion can be applied to any washing course, particularly, to a course of dispersing washing targets.

The cleaning performance of the squeeze motion is similar to that of the tumbling motion, and the vibration level thereof is higher than that of the tumbling motion. While tight contact of a washing target with the inner circumferential surface of a drum and removal of the washing target therefrom are repeated in the squeeze motion, washing water is discharged out of the drum through the washing target. Thus, the squeeze motion is appropriate to a rinsing course.

The cleaning performance of the filtration motion is lower than that of the squeeze motion, and the vibration level thereof is similar to that of the rolling motion. In the filtration motion, washing water is discharged out of a drum through a washing target tightly contacting the inner circumferential surface of the drum. Thus, the filtration motion is appropriate to a course of soaking a washing target.

The swing motion is lowest in vibration level and cleaning performance. Thus, the swing motion is appropriate to a washing course requiring low noise or vibration level and a delicate washing target.

Various drum driving motions may be selectively used according to a laundry amount in the same course or the same process.

The step motion, the rolling motion, the scrub motion, the filtration motion, the squeeze motion, and the swing motion, as the other motions except for the tumbling motion, may be referred to as specific motions.

In terms of energy consumed when washing the same laundry amount, the tumbling motion may be set to be smaller than the step motion, the rolling motion, the scrub motion, the filtration motion, and the squeeze motion. However, such setting of energy consumption according to the present disclosure is not limited thereto, and thus, energy consumption may be varied by changing a detailed control of each motion.

Figure 17:
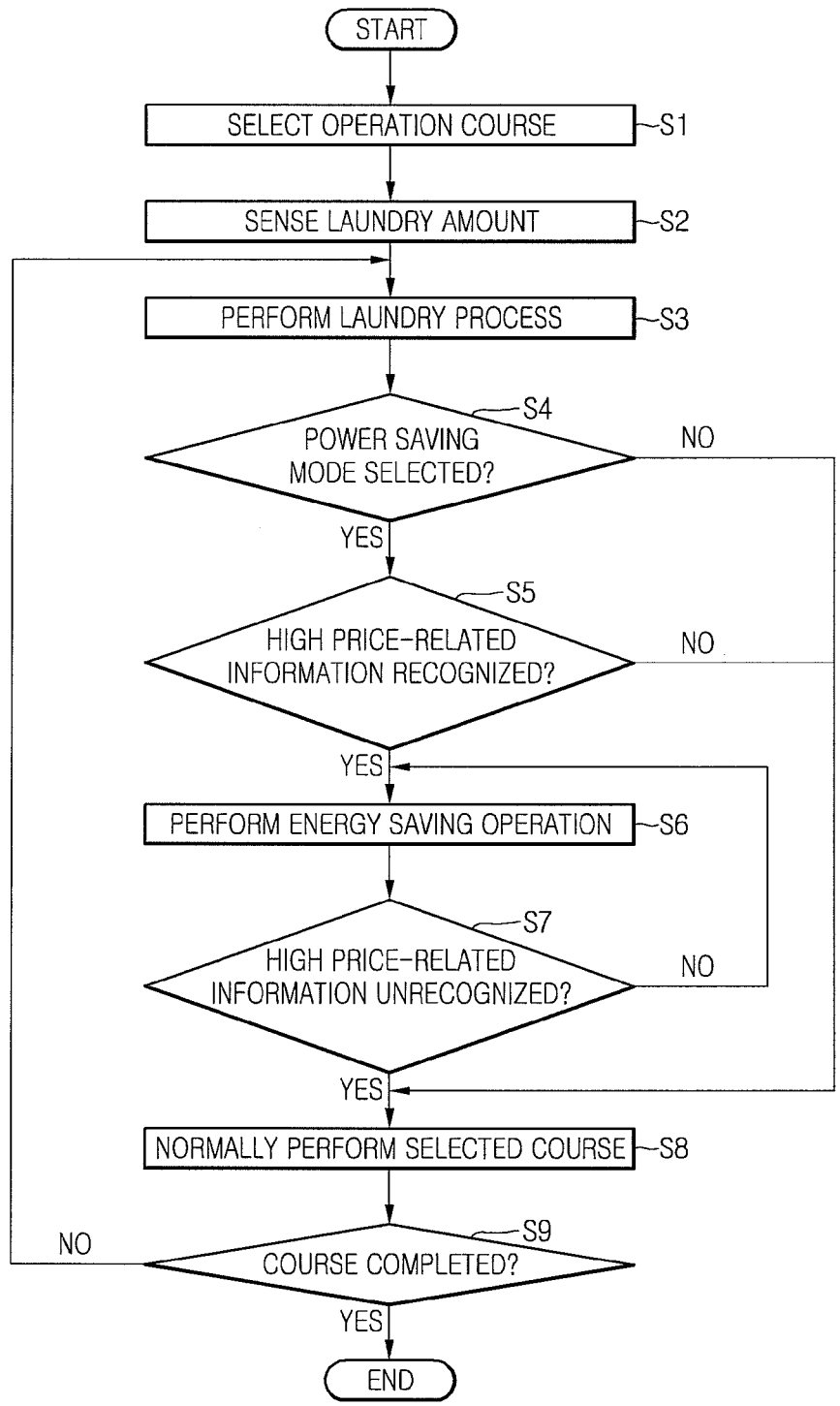
FIG. 17 is a flowchart illustrating a method of controlling a component according to the first embodiment.

FIG. 17 is a flowchart illustrating a method of controlling a component according to the first embodiment.

Referring to FIG. 17, an operation course (a washing course) of washing a washing target is selected using the course selection part 134 in operation S1. One of washing courses may be selected using the course selection part 134, and at least one of a normal motion and specific motions is performed in each course.

When an operation course is selected, the component senses a laundry amount in operation S2 to determine washing time and an water supply amount, and performs a laundry process in operation S3. In operation S4, the component determines whether a power saving mode is selected. If the power saving mode is selected, the power saving mode is performed. If a normal mode is selected, the normal mode is performed. That is, if the normal mode is selected, the selected course is normally performed in operation S8. In the current embodiment, the sentence "a selected course is normally performed" means that various motions and functions in the selected course are performed without a change. It may be determined whether the power saving mode is selected before or after the laundry process is started.

If the power saving mode is selected, while the component performs the laundry process, it is determined in operation S5 whether the control part recognizes high price-related information. The high price-related information may be determined by the control part or be received from the outside of the component.

If the control part recognizes high price-related information, the control part controls the component to perform an energy saving operation in operation S6. In particular, if the control part recognizes high price-related information while the component performs a specific motion, the control part controls the component to perform a normal motion. For example, if high price-related information is recognized while the rolling motion is performed in the washing process, the tumbling motion is performed.

While the component performs the energy saving operation, it is determined in operation S7 whether high price-related information is not recognized. According to the current embodiment, a failure in recognizing high price-related information may mean recognition of low price-related information.

If high price-related information is not recognized while the component performs the energy saving operation, the component normally performs the selected course in operation S8. If high price-related information is not recognized while the component performs the normal motion, the specific motion to be performed at a time point when high price-related information is not recognized is performed.

A case will now be exemplified, in which when the component normally performs the washing process, the scrub motion is performed for about 30 minutes and the rolling motion is performed for about 30 minutes. When the scrum motion is performed for about 10 minutes, high price-related information may be recognized, and a high price time period may be about 30 minutes. In this case, after the normal motion is performed, when high price-related information is not recognized, the component does not perform the scrum motion and perform the rolling motion. Operations S5 to S8 may be performed one or more times.

While the component normally performs the selected course, when the selected course is completed, the component is stopped in operation S9.

Reference values for determining high price-related information to change a motion may be set, thereby preventing a frequent motion change while the component is operated.

For example, when high price-related information (e.g., an on-peak) is recognized using an energy price, reference values for changing a motion may be set to an A value and a B value smaller than the A value.

When energy price-related information is real-time information, and a current price is greater than the A value, the on-peak is recognized. Then, a specific motion performed by the component is changed into the normal motion. The energy price may be varied during the normal motion. When the energy price is equal to or smaller than the B value, it is determined that the high price-related information is not recognized, and the component performs the specific motion again. When the energy price increases to be equal to or greater than the A value during the specific motion, the normal motion is performed again. Thus, according to the current embodiment, a frequent motion change according to a price variation can be prevented.

Alternatively, on/off peaks may be recognized using a reference value.

Although a specific motion is changed into the normal motion when high price-related information is recognized according to the current embodiment, a specific motion may not be changed. For example, when a selected course is one of the wool course, the delicate course, and the sportswear course, the swing motion may be performed. In this case, even in the case that high price-related information is recognized, the swing motion may not be changed. This is because protection of a washing target is more important than energy saving. Thus, a process of determining whether a motion change is needed when high price-related information is recognized may be added. That is, when high price-related information is recognized, it may be determined that a change of a method of controlling the motor 150 is needed. When a motion change is unneeded (when one of the wool course, the delicate course, and the sportswear course is selected), a current motion is maintained. When a motion change is needed, a current motion is changed into the normal motion.

Although a motion is immediately changed when high price-related information is recognized according to the current embodiment, a motion may not immediately be changed. For example, when high price-related information is recognized, the high price-related information may be transmitted to a mobile device of a user. In this case, only when the user selects a motion change, a motion is changed. Alternatively, when high price-related information is recognized, a motion may be immediately changed, and information denoting the change of the motion may be transmitted to a mobile device of a user.

According to the current embodiment, when high price-related information is recognized, a specific motion is changed into the normal motion, thereby decreasing energy costs.

Figure 18:
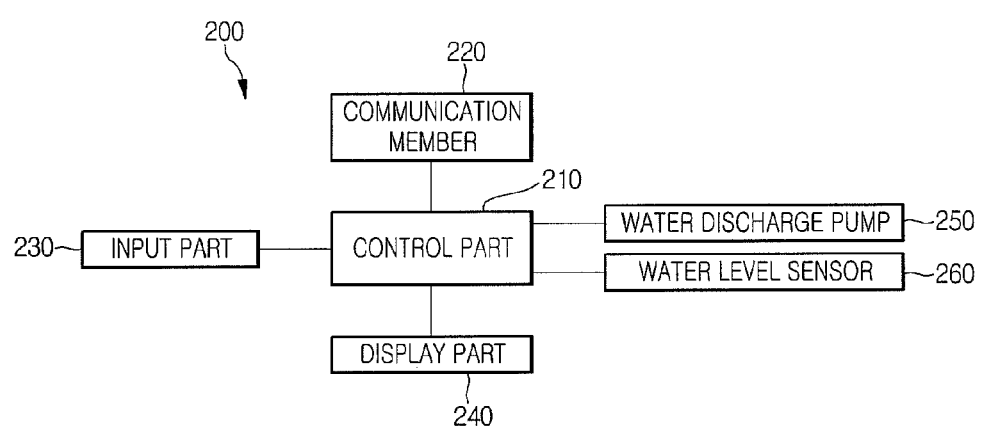
FIG. 18 is a block diagram illustrating a component constituting a home network according to a second embodiment.

FIG. 18 is a block diagram illustrating a component constituting a home network according to a second embodiment. According to the current embodiment, a washing device will be exemplified as a component. The washing device may be a washing machine or a dish washer, and includes a washing chamber or a drum for accommodating a washing target.

Hereinafter, a washing machine will be exemplified as the washing device.

Referring to FIG. 18, a component 200 according to the current embodiment may include: a control part 210; a communication member 220; an input part 230 for inputting an operation condition; a display part 240 for displaying at least one of an operation state, energy-related information, and addition information; a water discharge pump 250 for discharging wasted washing water; and a water level sensor 260 for sensing the level of washing water.

The communication member 220 may communicate with a component constituting a home network, or an utility network. Also, the communication member 220 may communicate with the control part 210. The control part 210 may receive at least one of first to third information pieces through the communication member 220. The control part 210 may recognize energy-related information, and control an operation of the component 200 according to recognized information. That is, the control part 210 may recognize high price-related information or low price-related information, and control at least an operation of the water discharge pump 250, based on recognized information.

The input part 230 may be used to not only input an operation condition of the component 200, but also select a normal mode and a power saving mode.

The water discharge pump 250 may include a water discharge motor (or a component driver part). When the water discharge pump 250 is operated, washing water is discharged out of the washing machine through a water discharge passage (not shown). Control of an operation of the water discharge pump 250 means control of an operation of the water discharge motor.

Hereinafter, a method of controlling the component 200 will be described.

Figure 19:
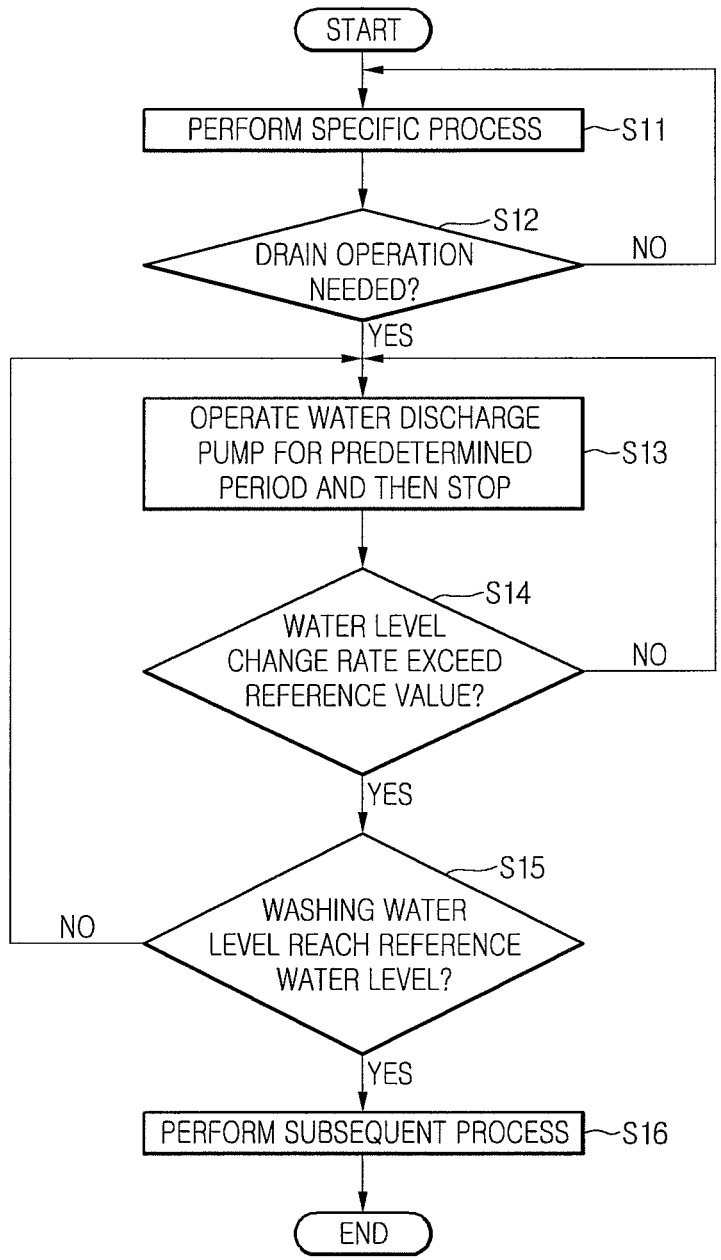
FIG. 19 is a flowchart illustrating a method of controlling a component according to the second embodiment.

FIG. 19 is a flowchart illustrating a method of controlling a component according to the second embodiment.

Referring to FIG. 19, when the component is turned on, and a start command is input, the component performs a washing operation.

When the component is a washing machine, the component may basically perform a washing process, a rinsing process, and a dehydrating process. When the component is a dish washer, the component may perform a washing process, a rinsing process, and a drying process.

A washing target is washed using washing water in the washing and rinsing processes. Specific processes described in the present specification use washing water. The specific processes using washing water require a drain operation to perform a subsequent process.

After the component starts to operate, a specific process that uses washing water is performed in operation S11. During the specific process, the control part determines in operation S12 whether the drain operation is required.

If the drain operation is required, the control part controls the water discharge pump to operate for a predetermined period and then stop, in operation S13. The predetermined period is time required for a siphon phenomenon to occur in the water discharge passage. The predetermined period may be varied depending on the disposition of the water discharge passage. When the siphon phenomenon occurs in the water discharge passage, washing water may be discharged without operating the water discharge pump.

While the washing water is discharged by the siphon phenomenon, it is determined in operation S14 whether a water level change rate exceeds a reference value. The water level change rate may be determined based on information sensed by the water level sensor.

Unless the water level change rate exceeds the reference value (and if the water level change rate is zero), operation S13 is performed since washing water is not substantially discharged. If the water level change rate exceeds the reference value, it is determined in operation S15 whether the level of the washing water reaches a reference water level. The reference water level is used to determine whether the drain operation is completed.

Unless the level of the washing water reaches the reference water level, operation S13 is performed. If the level of the washing water reaches the reference water level, the component performs a subsequent process in operation S16. For example, the specific process is the washing process, the subsequent process is the rinsing process. When the specific process is the rinsing process, the subsequent process is the dehydrating process in the case of a washing machine, and the drying process in the case of a dishwasher.

Although operation S13 is performed unless the water level change rate exceeds the reference value, operation S13 may not be performed. For example, the water discharge pump may be operated until the level of the washing water reaches the reference water level. Then, when the level of the washing water reaches the reference water level, the water discharge pump may be stopped.

According to the current embodiment, it is unnecessary to continually operate the water discharge pump until the drain operation is completed. Thus, energy consumption or energy usage costs according to an operation of the water discharge pump can be saved.

Figure 20:
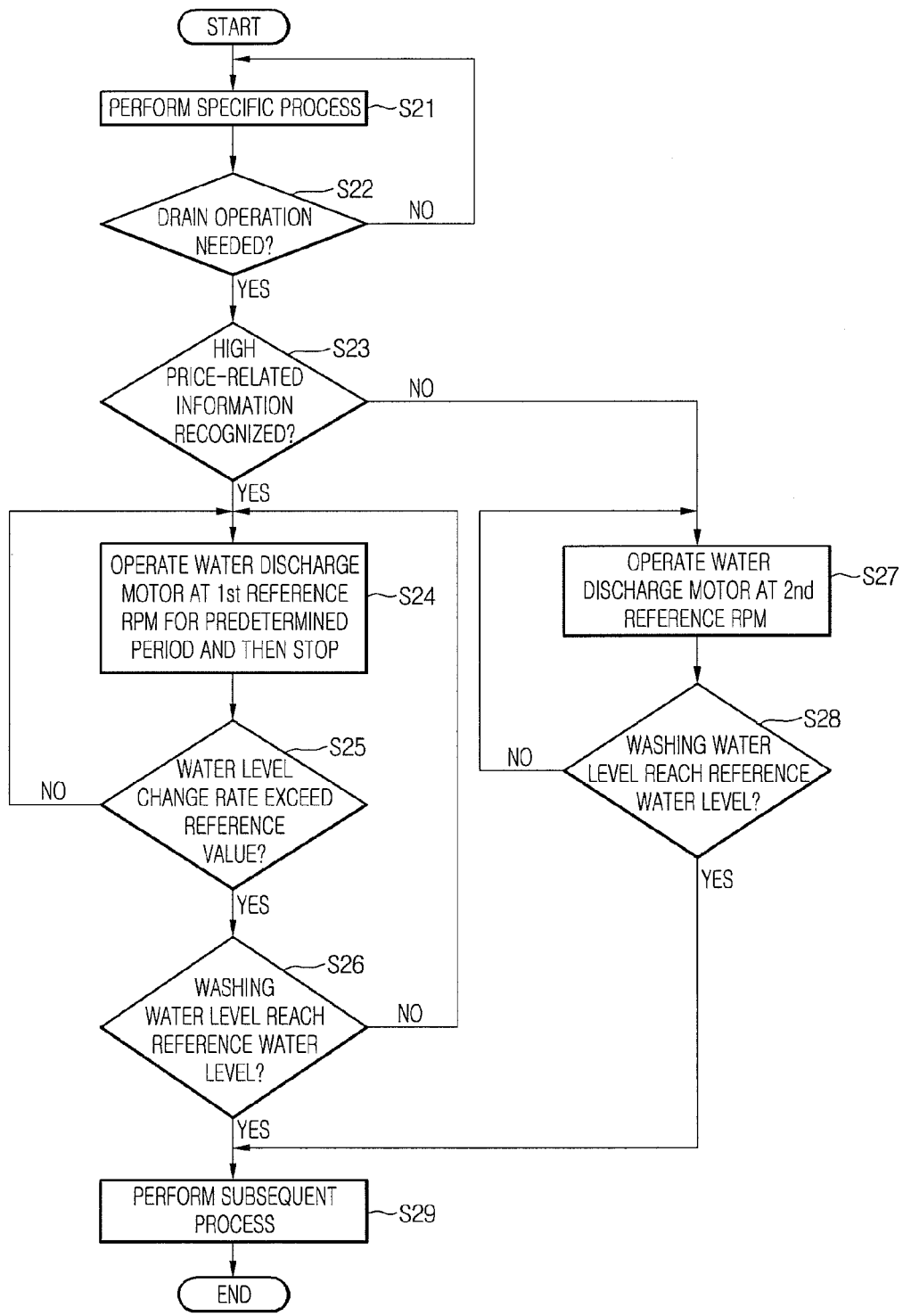
FIG. 20 is a flowchart illustrating a method of controlling a component according to a third embodiment.

FIG. 20 is a flowchart illustrating a method of controlling a component according to a third embodiment.

Referring to FIG. 20, when the component is turned on, and a start command is input, the component performs a washing operation.

After the component starts to operate, a specific process that uses washing water is performed in operation S21. During the specific process, the control part determines in operation S22 whether a drain operation is required.

If the drain operation is required, it is determined in operation S23 whether high price-related information is recognized. If high price-related information is recognized, the control part controls the water discharge motor to operate at a first reference RPM speed for a predetermined period and then stop, in operation S24. At this point, washing water is discharged by the siphon phenomenon. While the washing water is discharged by the siphon phenomenon, it is determined in operation S25 whether a water level change rate exceeds a reference value.

Unless the water level change rate exceeds the reference value (and if the water level change rate is zero), operation S24 is performed since washing water is not substantially discharged. If the water level change rate exceeds the reference value, it is determined in operation S26 whether the level of the washing water reaches a reference water level.

Unless the level of the washing water reaches the reference water level, operation S24 is performed. If the level of the washing water reaches the reference water level, the component performs a subsequent process in operation S29.

Unless high price-related information is recognized (if low price-related information is recognized), the control part controls the water discharge motor to operate at a second reference RPM speed in operation S27. Accordingly, the washing water is discharged by the water discharge motor. The first reference RPM speed is higher than the second reference RPM speed. Thus, drain effect according to the siphon phenomenon is improved.

In operation S28, it is determined whether the level of the washing water reaches the reference water level while the washing water is discharged. Unless the level of the washing water reaches the reference water level, operation S27 is performed. If the level of the washing water reaches the reference water level, the component performs the subsequent process in operation S29. That is, unless high price-related information is recognized, the water discharge motor is continually operated at the second reference RPM speed until the drain operation is completed.

Although operation S24 is performed unless the water level change rate exceeds the reference value in the state that high price-related information is recognized, operation S24 may not be performed. For example, the water discharge motor may be operated until the level of the washing water reaches the reference water level. Then, when the level of the washing water reaches the reference water level, the water discharge motor may be stopped.

According to the current embodiment, when energy saving is needed, it is unnecessary to continually operate the water discharge pump until the drain operation is completed. Thus, energy consumption or energy usage costs according to an operation of the water discharge pump can be saved.

What is claimed is:

1. A component for a network system, comprising:
   a communication device that receives at least energy information;
   a component driver part driven by supplied energy; and
   a washing chamber in which a washing target is accommodated;
   a control part that recognizes high price-related information or low price-related information, based on the energy information received by the communication device and that controls the component driver part,
   wherein a method of controlling the component driver part when the high price-related information is recognized is different from a method of controlling the component driver part when the low price-related information is recognized,
   wherein the component driver part comprises a motor for rotating the washing chamber,
   wherein a driving motion in which the washing target is moved is determined according to a method of controlling the motor, and the driving motion comprises a normal motion and at least one specific motion, a movement of the washing target in the normal motion is different from a movement of the washing target in the at least one specific motion,
   when the high price-related information is recognized while the specific motion is performed, the method of controlling the motor is changed to perform the normal motion.

2. The component according to claim 1, wherein when the low price-related information is recognized while the normal motion is performed, the method of controlling the motor is changed to perform a specific motion to be performed at a time point when the low price-related information is recognized.

3. The component according to claim 1, wherein energy consumption of the motor in the specific motion is smaller than energy consumption of the motor in the normal motion.

4. A component for a network system comprising:
   a communication device that receives at least energy information;
   a component driver part driven by supplied energy; and
   a washing chamber in which a washing target is accommodated;
   a control part that recognizes high price-related information or low price-related information, based on the energy information received by the communication device and that controls the component driver part,
   wherein a method of controlling the component driver part when the high price-related information is recognized is different from a method of controlling the component driver part when the low price-related information is recognized,
   wherein the component driver part comprises a motor for rotating the washing chamber,
   wherein a driving motion in which the washing target is moved is determined according to a method of controlling the motor, and the driving motion comprises a normal motion and at least one specific motion, a movement of the washing target in the normal motion is different from a movement of the washing target in the at least one specific motion,
   when the high price-related information is recognized while the specific motion is performed, it is determined whether a change of the driving motion is needed; and
   if a change of the driving motion is needed, the method of controlling the motor is changed to perform the normal motion.

5. The component according to claim 4, wherein unless a change of the driving motion is needed, the specific motion is maintained.

6. The component according to claim 5, wherein the component performs a selected washing course; and
   if the selected washing course is a wool course, a delicate course, or a sportswear course, a change of the driving motion is unneeded.

7. The component according to claim 4, wherein energy consumption of the motor in the specific motion is smaller than energy consumption of the motor in the normal motion.

8. A component for a network system, comprising:
   a communication device that receives at least energy information;
   a component driver part driven by supplied energy;
   a washing chamber in which a washing target is accommodated; and
   a control part that recognizes high price-related information or low price-related information, based on the energy information received by the communication device and that controls the component driver part,
   wherein a method of controlling the component driver part when the high price-related information is recognized is different from a method of controlling the component driver part when the low price-related information is recognized,
   wherein the component driver part comprises a water discharge motor for discharging washing water used for washing the washing target,
   wherein when a drain operation is needed during a specific process:
   if the control part recognizes the high price-related information, the water discharge motor is operated at a first reference revolutions per minute (RPM) speed for a predetermined period and is then stopped; and
   if a level of the washing water reaches a reference water level while the washing water is discharged a subsequent process is performed.

9. The component according to claim 8, wherein if the control part recognizes the low price-related information, the water discharge motor is operated at a second RPM speed until the drain operation is completed.

10. The component according to claim 9, wherein the first reference RPM speed is higher than the second reference RPM speed.

* * * * *